(12) United States Patent
Mori et al.

(10) Patent No.: US 7,070,849 B2
(45) Date of Patent: Jul. 4, 2006

(54) ANTI-REFLECTIVE FORMED ARTICLE AND METHOD FOR PREPARATION THEREOF, AND MOLD FOR ANTI-REFLECTIVE FORMED ARTICLE

(75) Inventors: Fujio Mori, Kyoto (JP); Tenri Isoda, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

(21) Appl. No.: 10/399,517

(22) PCT Filed: Oct. 17, 2001

(86) PCT No.: PCT/JP01/09095

§ 371 (c)(1),
(2), (4) Date: Apr. 17, 2003

(87) PCT Pub. No.: WO02/32644

PCT Pub. Date: Apr. 25, 2002

(65) Prior Publication Data
US 2004/0005436 A1 Jan. 8, 2004

(30) Foreign Application Priority Data

| Oct. 17, 2000 | (JP) | 2000-316025 |
| Oct. 23, 2000 | (JP) | 2000-322046 |
| Nov. 13, 2000 | (JP) | 2000-345288 |

(51) Int. Cl.
B32B 3/00 (2006.01)
D06N 7/04 (2006.01)

(52) U.S. Cl. ............ 428/141; 428/161; 428/325; 428/212

(58) Field of Classification Search ........ 359/569; 428/432, 216, 428, 434, 336, 697, 698, 699, 428/141, 161
See application file for complete search history.

(56) References Cited

U.S. PATENT DOCUMENTS

| 5,104,692 A | 4/1992 | Belmares ............ 427/164 |
| 5,925,438 A | 7/1999 | Ota et al. ............ 428/141 |
| 6,110,595 A | 8/2000 | Suzuki et al. ........ 428/423 |
| 6,387,515 B1* | 5/2002 | Joret et al. ........... 428/432 |
| 2003/0016447 A1* | 1/2003 | Kato et al. ........... 359/569 |

FOREIGN PATENT DOCUMENTS

| EP | 0 989 443 | 3/2000 |
| EP | 000989443 A2 * | 3/2000 |
| JP | 6-16851 | 1/1994 |
| JP | 8-142118 | 6/1996 |
| JP | 9-80204 | 3/1997 |
| JP | 10-726 | 1/1998 |
| JP | 10-172377 | 6/1998 |
| JP | 10-268105 | 10/1998 |
| JP | 2000-329905 | 11/2000 |
| JP | 2001-330704 | 11/2001 |

* cited by examiner

Primary Examiner—Harold Pyon
Assistant Examiner—Patricia L. Nordmeyer
(74) Attorney, Agent, or Firm—Wenderoth, Lind & Ponack, L.L.P.

(57) ABSTRACT

An anti-reflection molding has a transparent substrate and an anti-reflection layer provided at least on a surface of the transparent substrate, an interface of a transparent window on which the anti-reflection layer is formed has an average surface roughness Ra of between 2.0 and 150 nm, and the molding has a curved surface having a radius of curvature of not less than 40 mm and protruding on a surface side, or a flat surface, in the transparent window.

31 Claims, 17 Drawing Sheets

Fig.14

| USES OF ANTI-REFLECTION MOLDING | REQUIRED REFLECTANCE (%) | Ra (nm) |
|---|---|---|
| PICTURE FRAME, PHOTO STAND, WINDOW GLASS | 1.5~2 | 140~150 |
| CLOCK, OUTDOOR BULLETIN BOARD | 0.9~1.5 | 110~140 |
| DIGITAL CAMERA | 0.4~0.9 | 85~110 |
| TELEVISION, VIDEO CAMERA | 0.3~0.4 | 85~35 |
| DISPLAY SECTION OF PORTABLE TELEPHONE, MONITOR FOR PERSONAL COMPUTER, ELECTRONIC PAPER | NOT MORE THAN 0.2 % | 2~35 |

RADIUS OF CURVATURE R

US 7,070,849 B2

ANTI-REFLECTIVE FORMED ARTICLE AND METHOD FOR PREPARATION THEREOF, AND MOLD FOR ANTI-REFLECTIVE FORMED ARTICLE

This application is a National Stage of PCT/JP01/09095, filed Oct. 17, 2001.

TECHNICAL FIELD

The present invention relates to an anti-reflection molding that is used so that a display (a member having a function as a display screen) or the like located therebehind, such as various displays of portable telephone, video camera, digital camera, equipment for automobile, PDA (Personal Digital Assistant), monitor for personal computer, electronic paper that is an electronic display device as light, thin, and flexible as paper, television, and the like, various electronic equipment such as electronic equipment for outdoor display, and such various display members of equipment other than electronic equipment as an outdoor bulletin board, picture frame, photo stand, clock, and window glass, may be seen through the molding, relates to a method of manufacturing the same, and relates to a mold for the anti-reflection molding.

BACKGROUND ART

A display section of a portable telephone, a video camera, a digital camera, equipment for an automobile, and the like is configured in combination with a liquid crystal panel or an organic EL panel or in the like manner. The display section is covered with a cover component composed of a transparent substrate shaped like a convex lens or a transparent substrate formed with a pattern such as a border, for purposes of prevention of breakage in the liquid crystal panel, magnification of displayed items on the liquid crystal panel, decoration of a neighborhood of the liquid crystal panel, or the like.

A transparent window of such a cover component as described above is required to have a glare-proof property in order that displayed pictures may be seen comfortably. Besides, a hard-coat property is required that is excellent in marring resistance, chemical resistance, weather resistance, and the like. This is why formation of an anti-reflection layer, that makes use of Fresnel reflection and interference of light, is necessary.

In this method, it is extremely important to control a thickness of the anti-reflection layer, and a thickness equal to a quarter wavelength maximizes an anti-reflection effect because reflected light from a film surface and reflected light from a film-substrate interface then cancel each other out, and thus a reflectance decreases. For an anti-reflection layer having an index of refraction of 1.36, for example, an optimal thickness of the anti-reflection layer is on the order of 0.1 μm on condition that a central wavelength of transmitted light is 550 nm.

It is, however, extremely difficult to form such an anti-reflection film layer with a uniform thickness on a transparent substrate, and thus an issue arises wherein it is difficult to achieve an expected anti-reflection effect. Provided that a general shape of the transparent substrate is three-dimensional, particularly, it is extremely difficult to form a film with a uniform thickness thereon and it is difficult to achieve an expected anti-reflection effect.

Besides, there is another issue in that the anti-reflection layer described above is inferior in terms of a hard-coat property.

An object of the present invention is therefore to provide an anti-reflection molding that cancels such defects as described above and that has an excellent anti-reflection effect and an excellent hard-coat property, a method of manufacturing the same, and a mold and a transfer member for the anti-reflection molding.

SUMMARY OF THE INVENTION

For achievement of the above object, the present invention is configured as follows.

According to a first aspect of the present invention, there is provided a method of manufacturing anti-reflection molding, comprising:

placing a decorating sheet having at least a hard-coat layer formed on a substrate sheet to come, on a substrate sheet side thereof, into contact with a cavity surface of a mold that is a curved surface having a radius of curvature of not less than 40 mm, or a flat surface, in an area corresponding to a transparent window;

injecting transparent molten resin into the mold to obtain an integrated body of the decorating sheet and a transparent substrate composed of the resin;

subsequently peeling the substrate sheet from the integrated body to form a curved surface having a radius of curvature of not less than 40 mm and protruding on a surface side thereof, or a flat surface, that has an average surface roughness Ra of between 2.0 and 150 nm in the transparent window; and subsequently forming an anti-reflection layer on a surface side of the transparent substrate.

According to a second aspect of the present invention, there is provided a method of manufacturing an anti-reflection molding, comprising:

placing a decorating sheet having at least a hard-coat layer formed on a substrate sheet to come, on a side having the hard-coat layer, into contact with a cavity surface of a mold that is a curved surface having a radius of curvature of not less than 40 mm, or a flat surface, in an area corresponding to a transparent window;

injecting transparent molten resin into the mold to obtain an integrated body of the decorating sheet and of a transparent substrate composed of the resin and to form a curved surface having a radius of curvature of not less than 40 mm and protruding on a surface side thereof in a shape of the transparent window, or a flat surface, that has an average surface roughness Ra of between 2.0 and 150 nm in the transparent window; and subsequently forming an anti-reflection layer on a surface side of the transparent substrate.

According to a third aspect of the present invention, there is provided a method of manufacturing an anti-reflection molding as defined in any one of the first and second aspects, wherein the decorating sheet has the hard-coat layer, a partial pattern layer with a pattern excluding the transparent window, and an adhesive layer that are formed at least on the substrate sheet.

According to a fourth aspect of the present invention, there is provided a method of manufacturing an anti-reflection molding as defined in the third aspect, wherein an anti-fouling layer is formed on the anti-reflection layer.

According to a fifth aspect of the present invention, there is provided a mold for anti-reflection molding by which an anti-reflection molding is molded that has at least a hard-coat layer formed on a surface of a transparent substrate, and that has a curved surface having a radius of curvature of not less than 40 mm and protruding on a surface side thereof in a transparent window, or a flat surface, with an average surface roughness Ra of between 2.0 and 150 nm in the transparent window, with the mold for anti-reflection molding having a cavity surface that is a curved surface having a radius of curvature of not less than 40 mm, or a flat surface, in an area corresponding to the transparent window.

According to a sixth aspect of the present invention, there is provided a mold for anti-reflection molding as defined in the fifth aspect, wherein the cavity surface has an average surface roughness Ra of between 2.0 and 170 nm in the area corresponding to the transparent window.

According to a seventh aspect of the present invention, there is provided an anti-reflection molding comprising:

a transparent substrate; and an anti-reflection layer provided at least on a surface of the transparent substrate, in which an interface of a transparent window having the anti-reflection layer formed thereon has an average surface roughness Ra of between 2.0 and 150 nm, and in which the transparent window has a curved surface having a radius of curvature of not less than 40 mm and protruding on a surface side, or a flat surface.

According to an eighth aspect of the present invention, there is provided an anti-reflection molding as defined in the seventh aspect, wherein a partial pattern layer with a pattern excluding the transparent window is provided between the transparent substrate and the anti-reflection layer.

According to a ninth aspect of the present invention, there is provided an anti-reflection molding as defined in any one of the seventh and eighth aspects, wherein a hard-coat layer is formed between the transparent substrate and the anti-reflection layer.

According to a 10th aspect of the present invention, there is provided an anti-reflection molding as defined in the ninth aspect, wherein an anti-fouling layer is provided on the anti-reflection layer.

According to an 11th aspect of the present invention, there is provided an anti-reflection molding as defined in any one of the seventh and eighth aspects, wherein a central visual recognition area in the transparent window has an average surface roughness Ra of between 2 and 35 nm, and wherein a peripheral visual recognition area, along a periphery of the central visual recognition area in the transparent window, has an average surface roughness Ra of between 35 and 85 nm.

According to a 12th aspect of the present invention, there is provided an anti-reflection transfer member in which, on a substrate sheet, at least an anti-reflection layer is provided, directly or with a mold release layer therebetween, and in which a surface of the substrate sheet or a surface of the mold release layer has an average surface roughness Ra of between 2.0 and 150 nm.

According to a 13th aspect of the present invention, there is provided an anti reflection transfer member as defined in the 12th aspect, wherein the surface of the substrate sheet or the surface of the mold release layer has an average surface roughness Ra of between 5.0 and 140 nm.

According to a 14th aspect of the present invention, there is provided an anti-reflection transfer member as defined in the 13th aspect, wherein the surface of the substrate sheet or the surface of the mold release layer has an average surface roughness Ra of between 5.0 and 80 nm.

According to a 15th aspect of the present invention, there is provided an anti-reflection transfer member as defined in any one of the 12th through 14th aspects, wherein a hard-coat layer composed of ultraviolet curable resin, electron beam curable resin, or thermosetting resin is provided on the anti-reflection layer.

According to a 16th aspect of the present invention, there is provided an anti-reflection transfer member as defined in any one of the 12th and 13th aspects, wherein a pattern layer is formed in an area excluding a transparent window.

According to a 17th aspect of the present invention, there is provided an anti-reflection member in which two anti-reflection component layers having interfaces with uneven shapes between both the layers are stacked on a transparent window of a transparent substrate.

According to an 18th aspect of the present invention, there is provided an anti-reflection member as defined in the 17th aspect, wherein the uneven shapes exhibit an average surface roughness Ra of between 0.2 and 1.0 μm.

According to a 19th aspect of the present invention, there is provided an anti-reflection member as defined in any one of the 17th and 18th aspects, wherein an upper layer of the anti-reflection component layers is composed of thermosetting resin, ultraviolet curable resin, or electron beam curable resin.

According to a 20th aspect of the present invention, there is provided an anti-reflection member as defined in the 19th aspect, wherein a low-reflectance layer having a reflectance lower than that of the upper layer is layered on the upper layer of the anti-reflection component layers.

According to a 21st aspect of the present invention, there is provided an anti-reflection member as defined in the 20th aspect, wherein an anti-fouling layer is layered on the low-reflectance layer.

According to a 22nd aspect of the present invention, there is provided an anti-reflection member as defined in any one of the 17th and 18th aspects, wherein a pattern layer is formed outside the transparent window.

According to a 23rd aspect of the present invention, there is provided a method of manufacturing an anti-reflection member, comprising:

setting a transfer member wherein at least two anti-reflection component layers having interfaces with uneven shapes between both the layers are formed on a substrate sheet, in a mold to bring the substrate sheet into contact with a cavity surface;

injecting transparent molten resin into the mold to obtain an integrated body of the transfer member and a transparent substrate composed of the resin; and subsequently peeling the substrate sheet from the integrated body.

According to a 24th aspect of the present invention, there is provided a method of manufacturing an anti-reflection member as defined in the 23rd aspect, wherein the uneven shapes exhibit an average surface roughness Ra of between 0.2 and 1.0 μm.

According to a 25th aspect of the present invention, there is provided a method of manufacturing an anti-reflection member as defined in any one of the 23rd and 24th aspects, wherein an upper layer of the anti-reflection component layers is composed of thermosetting resin, ultraviolet curable resin, or electron beam curable resin.

According to a 26th aspect of the present invention, there is provided a method of manufacturing an anti-reflection member as defined in any one of the 23rd and 24th aspects, wherein a low-reflectance layer having a reflectance lower than that of the upper layer is formed on the upper layer of the anti-reflection component layers.

According to a 27th aspect of the present invention, there is provided a method of manufacturing an anti-reflection member as defined in the 26th aspect, wherein an antifouling layer is formed on the low-reflectance layer.

According to a 28th aspect of the present invention, there is provided a method of manufacturing an anti-reflection member as defined in any one of the 23rd and 24th aspects, wherein a pattern layer is formed outside the transparent window.

According to a 29th aspect of the present invention, there is provided an anti-reflection molding comprising:

a transparent substrate;

two anti-reflection component layers stacked on a transparent window of the transparent substrate and having interfaces with uneven shapes between both the layers;

a hard-coat layer provided on the two anti-reflection component layers; and an anti-reflection layer provided on the hard-coat layer, in which an interface of the transparent window having the anti-reflection layer formed thereon has an average surface roughness Ra of between 2.0 and 150 nm, and in which the transparent window has a curved surface having a radius of curvature of not less than 40 mm and protruding on a surface side thereof, or a flat surface.

According to a 30th aspect of the present invention, there is provided an anti-reflection transfer member in which, on a substrate sheet, at least an anti-reflection layer is provided, directly or with a mold release layer therebetween, in which a surface of the substrate sheet or a surface of the mold release layer has an average surface roughness of Ra between 2.0 and 150 nm, and in which two anti-reflection component layers having interfaces with uneven shapes between both the layers are stacked on a part of a surface of the anti-reflection layer or the mold release layer opposite to the substrate sheet and facing a transparent window.

BRIEF DESCRIPTION OF DRAWINGS

These and other aspects and features of the present invention will become clear from the following description taken in conjunction with the preferred embodiments thereof with reference to the accompanying drawings, in which:

FIG. 14 is an explanatory diagram illustrating a relationship between required reflectances and surface roughnesses Ra in various examples of anti-reflection molding of the first embodiment of the present invention;

DETAILED DESCRIPTION OF THE PREFERRED EMBODIMENTS

Figure 1A:
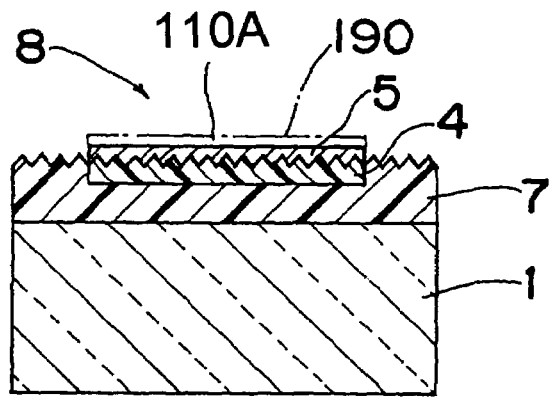
FIG. 1A is a sectional view illustrating an anti-reflection molding of a first embodiment of the present invention.

Before description of the present invention proceeds, it is to be noted that like parts are designated by like reference numerals throughout the accompanying drawings.

First Embodiment

A first embodiment of the present invention will be described in detail with reference to the drawings.

Figure 1B:
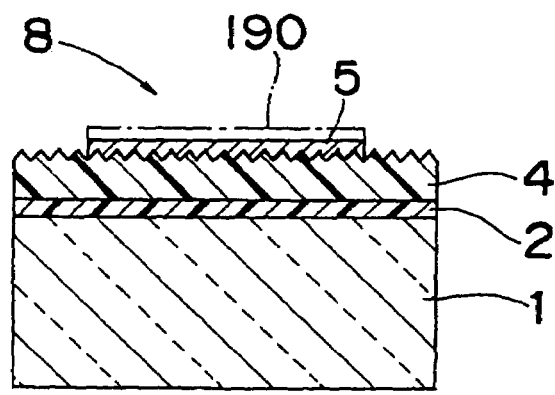
FIG. 1B is a sectional view illustrating an anti-reflection molding of the first embodiment of the present invention.
Figure 1C:
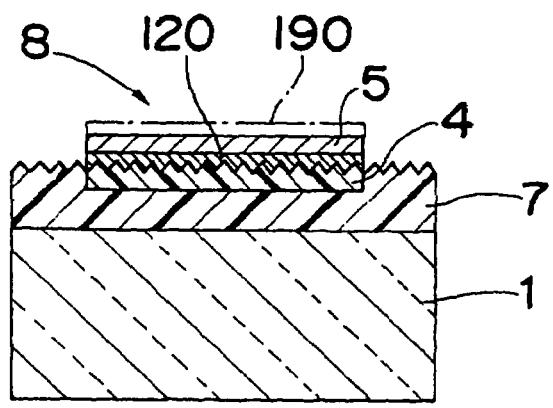
FIG. 1C is a sectional view illustrating an anti-reflection molding of the first embodiment of the present invention.
Figure 2:
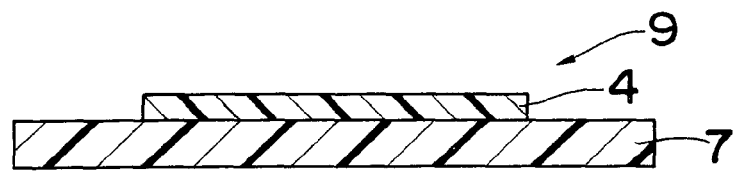
FIG. 2 is a sectional view illustrating a decorating sheet that is used in a method of manufacturing the anti-reflection molding of the first embodiment of the present invention.
Figure 6:
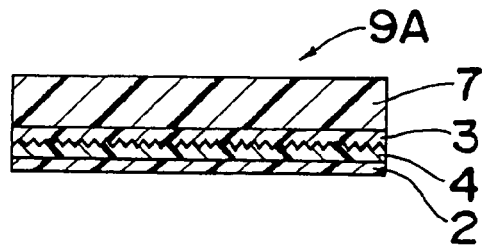
FIG. 6 is a sectional view illustrating a decorating sheet that is used in the method of manufacturing anti-reflection moldings of the first embodiment of the present invention.
Figure 7:
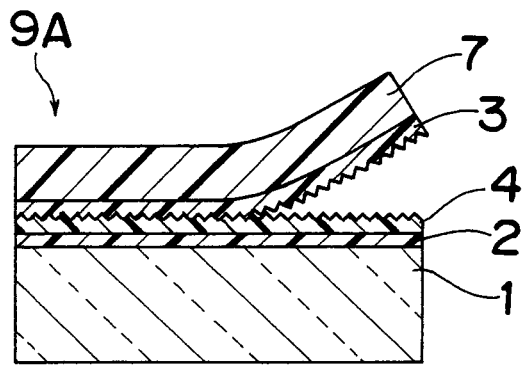
FIG. 7 is a sectional view illustrating a step in the method of manufacturing anti-reflection moldings of the first embodiment of the present invention.
Figure 8:
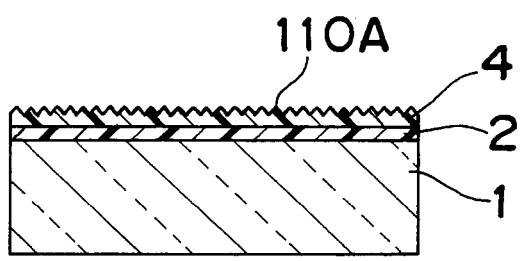
FIG. 8 is a sectional view illustrating a step in the method of manufacturing anti-reflection moldings of the first embodiment of the present invention.
Figure 9:
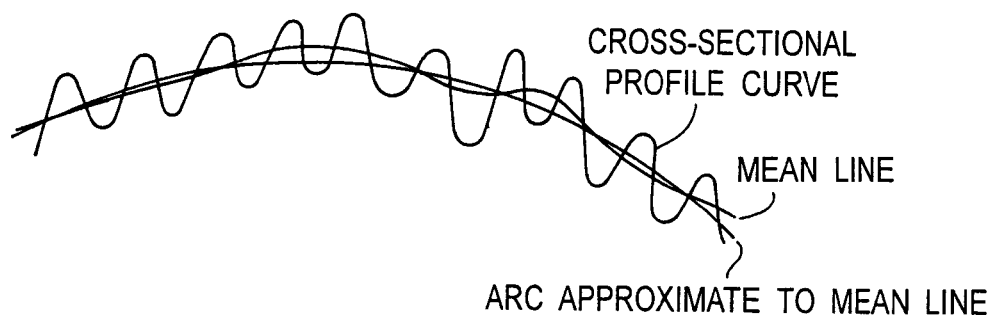
FIG. 9 is a graph for obtainment of an average surface roughness Ra in the first embodiment of the present invention.
Figure 10:
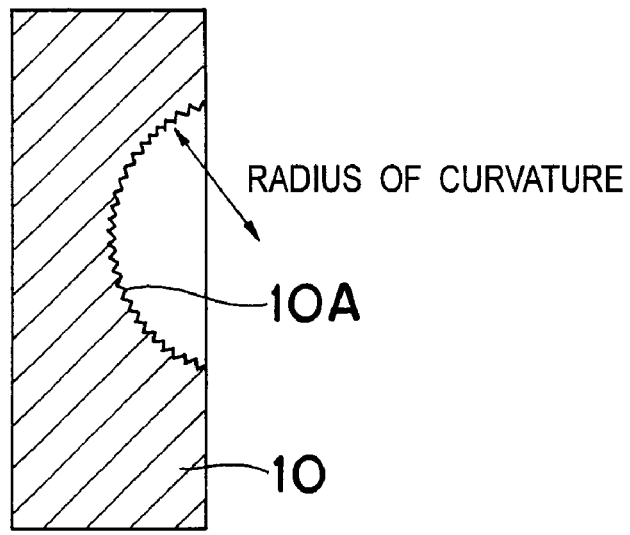
FIG. 10 is a sectional view illustrating a mold for the anti-reflection moldings of the first embodiment of the present invention.
Figure 11:
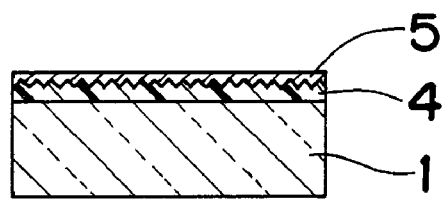
FIG. 11 is a sectional view illustrating an anti-reflection molding of the first embodiment of the present invention.
Figure 12:
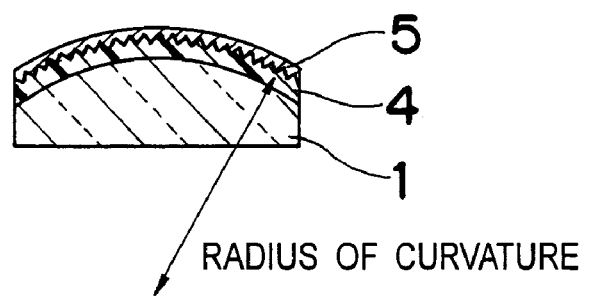
FIG. 12 is a sectional view illustrating an anti-reflection molding of the first embodiment of the present invention.
Figure 13A:
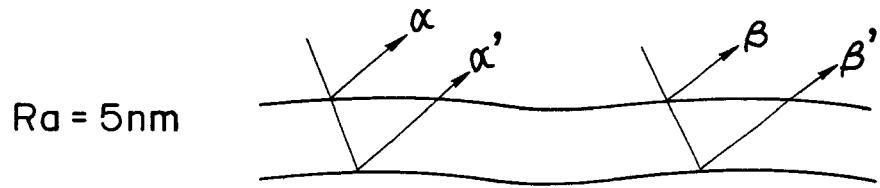
FIGS. 13A, 13B, and 13C are schematic sectional views illustrating how an anti-reflection effect varies with respect to different average surface roughnesses Ra.
Figure 13B:
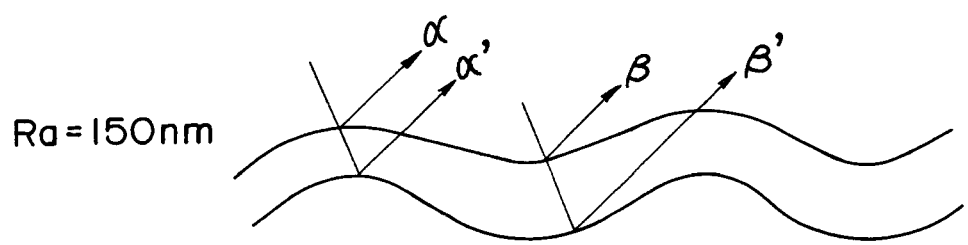
Figure 13C:
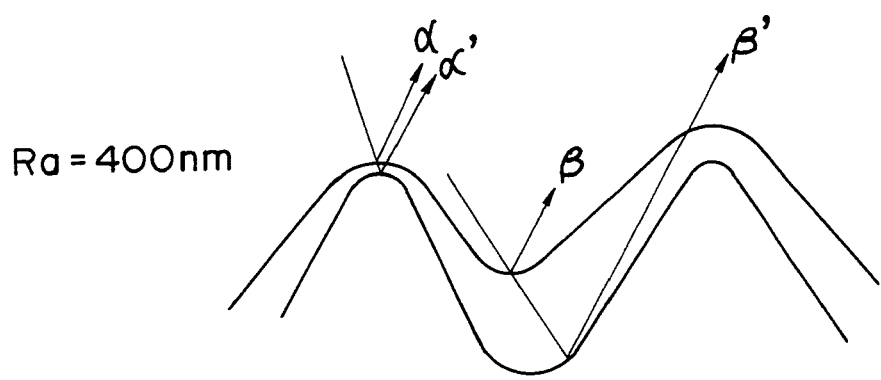
Figure 15:
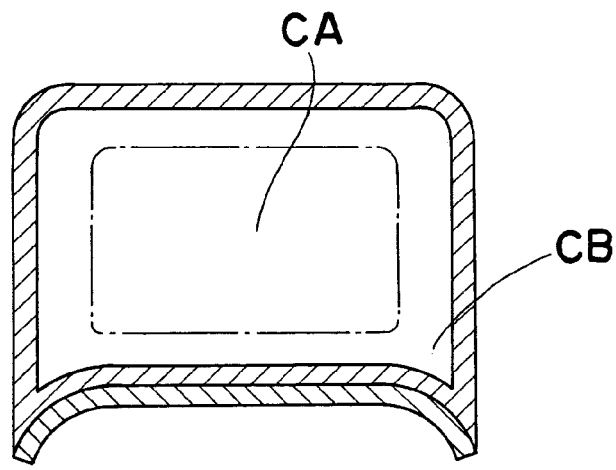
FIG. 15 is a perspective view of an anti-reflection molding, illustrating various areas in anti-reflection moldings of the embodiments of the present invention.
Figure 16:
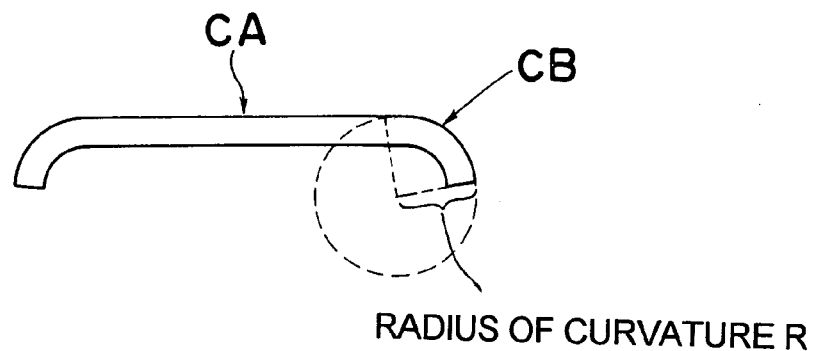
FIG. 16 is a sectional view of the anti-reflection molding, illustrating various areas in the anti-reflection moldings of the embodiments of the present invention.
Figure 17:
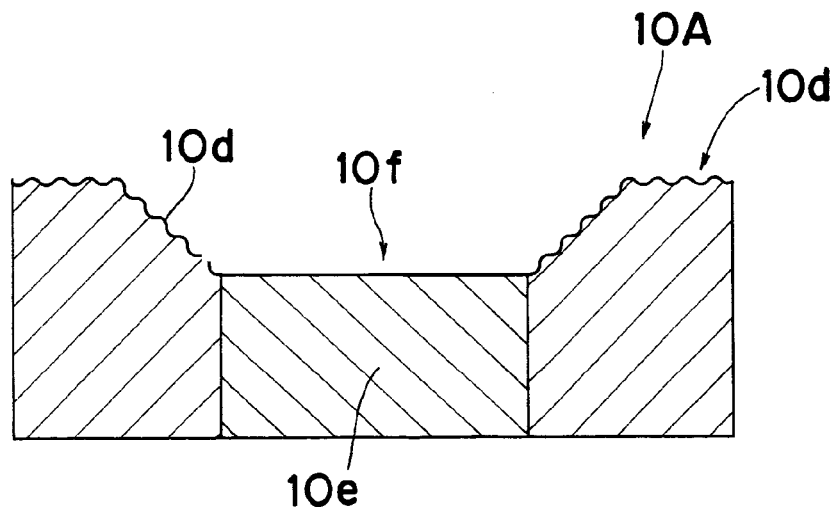
FIG. 17 is a sectional view illustrating a mold for molding that is used in the method of manufacturing anti-reflection moldings of the first embodiment of the present invention.

FIG. 1A is a sectional view illustrating an anti-reflection molding of the first embodiment of the present invention. FIG. 1B is a sectional view illustrating an anti-reflection molding of the first embodiment of the present invention. FIG. 1C is a sectional view illustrating an anti-reflection molding of the first embodiment of the present invention. FIG. 2 is a sectional view illustrating a decorating sheet that is used in a method of manufacturing anti-reflection moldings of the first embodiment of the present invention. FIGS. 3A through FIG. 5 are sectional views illustrating steps in a method of manufacturing anti-reflection moldings of the first embodiment of the present invention. FIG. 6 is a sectional view illustrating a decorating sheet that is used in the method of manufacturing anti-reflection moldings of the first embodiment of the present invention. FIGS. 7 and 8 are sectional views illustrating steps in the method of manufacturing anti-reflection moldings of the first embodiment of the present invention. FIG. 9 is a graph for obtainment of an average surface roughness Ra in the first embodiment of the present invention. FIG. 10 is a sectional view illustrating a mold for the anti-reflection moldings of the first embodiment of the present invention. FIGS. 11 and 12 are sectional views illustrating anti-reflection moldings of the first embodiment of the present invention. FIGS. 13A through 13C are schematic sectional views illustrating how an anti-reflection effect varies with respect to different average surface roughnesses Ra. FIG. 14 is an explanatory diagram illustrating a relationship between required reflectances and surface roughnesses Ra in various examples of anti-reflection molding of the first embodiment of the present invention. FIG. 15 is a perspective view illustrating an anti-reflection molding of the first embodiment of the present invention. FIG. 16 is a sectional view illustrating the anti-reflection molding of the first embodiment of the present invention. FIG. 17 is a sectional view illustrating a mold for molding that is used in the method of manufacturing anti-reflection moldings of the first embodiment of the present invention.

In the drawings, reference numeral 1 denotes a transparent substrate, numeral 2 denotes an adhesive layer, numeral 3 denotes a mold release layer, numeral 4 denotes a hard-coat layer, numeral 5 denotes an anti-reflection layer, numeral 7 denotes a substrate sheet, numeral 8 denotes an anti-reflection molding, numeral 9 denotes a decorating sheet, and numeral 10 denotes a metal mold for manufacturing the anti-reflection molding 8.

The anti-reflection molding 8 of the first embodiment of the present invention is composed of the substrate sheet 7, the decorating sheet 9 having at least the hard-coat layer 4 formed on the substrate sheet 7, the transparent substrate 1 made of resin that is integrated with the decorating sheet 9, and the anti-reflection layer 5 provided on a surface side of the transparent substrate 1. In a transparent window is formed a curved surface having a radius of curvature of not less than 40 mm and protruding on a surface side in the transparent window, or a flat surface that has an average surface roughness Ra of between 2.0 and 150 nm.

In the method of manufacturing the anti-reflection molding 8 in accordance with the first embodiment of the present invention, the decorating sheet 9 (see FIG. 2) having at least the hard-coat layer 4 formed on the substrate sheet 7 is placed so that the hard-coat layer 4 is received within a cavity 10B having a cavity surface 10A (see FIG. 10 and FIG. 3A) of the metal mold 10 that is a curved surface having a radius of curvature of not less than 40 mm, or is a flat surface in an area corresponding to the transparent window (see FIG. 3A), transparent molten resin 1A is injected into the cavity 10B of the metal mold 10 so that an integrated body of the decorating sheet 9 and the transparent substrate 1 formed of the resin 1A is obtained (see FIG. 4), the substrate sheet 7 is subsequently peeled from integrated body 100 so that a curved surface having a radius of curvature of not less than 40 mm and protruding on the surface side in the transparent window 110A, or a flat surface that has an average surface roughness Ra of between 2.0 and 150 nm is formed in the transparent window (see FIG. 4), and the anti-reflection layer 5 is subsequently formed on the surface side of the transparent substrate 1 (see FIG. 1A).

Alternatively, a position of the decorating sheet 9 in the metal mold 10 may be reversed. That is, a configuration is made as follows. The decorating sheet 9 is placed so that the substrate sheet 7 (see FIG. 3B) comes into contact with the cavity surface 10A (see FIG. 10 and FIG. 3B) of the metal mold 10 that is a curved surface having a radius of curvature of not less than 40 mm, or is a flat surface in an area corresponding to the transparent window, transparent molten resin 1A is injected into the cavity 10B of the metal mold 10 so that an integrated body of the decorating sheet 9 and the transparent substrate 1 formed of the resin 1A is obtained, the substrate sheet 7 is subsequently peeled from the integrated body so that a curved surface having a radius of curvature of not less than 40 mm and protruding on the surface side in the transparent window 110A, or is a flat surface, that has an average surface roughness Ra of between 2.0 and 150 nm, is formed in the transparent window 110A (see FIG. 8), and the anti-reflection layer 5 is subsequently formed on the hard-coat layer 4 on the surface side of the transparent substrate 1 (see FIG. 1B).

In the anti-reflection molding of the first embodiment of the present invention, it is important that an average surface roughness Ra of an interface of the transparent window on which the anti-reflection layer 5 is formed is between 2.0 and 150 nm, and that the molding has a curved surface having a radius of curvature of not less than 40 mm or a flat surface in the transparent window.

A test was conducted concerning an order on or below which the average surface roughness Ra of the surface of the molding has to be for formation of the anti-reflection layer 5 with a uniform thickness. Metal molds 10 having surfaces grained to various degrees were produced, moldings having various average surface roughnesses Ra were produced, and the average surface roughnesses Ra were measured with a measuring apparatus (F3500D produced by Kosaka Laboratory Ltd.) in conformance with Japanese Industrial Standard (JIS) B0601-1994. To JIS B 0601 correspond ISO468: 82, ISO3274:75, ISO4287-1:84, ISO4287-2:84, and ISO4288:85. Subsequently, anti-reflection layers 5 were formed on the same condition, and reflectances at 550 nm were measured with a spectrophotometer. As a result of measurement of anti-reflection effects of the moldings in this manner, as shown in Table 1, it was found that an anti-reflection effect can be obtained with average surface roughnesses Ra of a surface of a molding being not more than 150 nm. More preferably, the average surface roughness Ra of the surface of the molding is not more than 80 nm.

It was also found that production with an average surface roughness Ra of less than 2.0 nm is extremely difficult to achieve, and that a tolerance of thickness of the anti-reflection layer 5 and a reflectance of the anti-reflection molding 8 manufactured with the layer hardly change with the average surface roughnesses Ra being not more than 35 nm. Herein, the reflectance is a numerical value obtained with a measuring method of ISO/DIS13406-2.

FIGS. 13A through 13C are schematic sectional views illustrating how the anti-reflection effect varies with respect to different average surface roughnesses Ra. The anti-reflection layer 5 was formed so as to have a thickness of 100 nm. On condition that the average surface roughness Ra is 5 nm (see FIG. 13A), for example, thicknesses of the anti-reflection layer 5 are generally uniform, there occurs moderate interference between reflected rays of light α and α', β and β', and a uniform and excellent anti-reflection effect can be achieved throughout the anti-reflection layer 5. On condition that the average surface roughness Ra is 150 nm (see FIG. 13B), thicknesses of the anti-reflection layer 5 partially exhibit a variation, degrees of interference between reflected rays of light α and α', β and β' may be different, and an anti-reflection effect may decrease slightly and locally on the anti-reflection layer 5. On condition that the average surface roughness Ra is 400 nm (see FIG. 13C), thicknesses of the anti-reflection layer 5 are not uniform, there occurs no interference between reflected rays of light α and α', β and β', and no anti-reflection effect is achieved throughout the anti-reflection layer 5.

As shown in FIG. 14, required reflectances differ according to uses of the anti-reflection molding 8, and a range of average surface roughnesses Ra has to be selected accordingly and appropriately.

In general, the greater viewing frequency a use of an anti-reflection molding involves, the greater anti-reflection effect the molding requires and it is desirable for the molding to have a small average surface roughness Ra. That is, a great viewing frequency heavily burdens eyes of a viewer. Little reflection increases comfort during viewing and therefore increases resistance of eyes to fatigue. Accordingly, achievement of a great anti-reflection effect leads to prevention of fatigue of eyes of viewers. Provided that the viewing frequency is high, the molding preferably has a great anti-reflection property with a reflectance of not more than 0.5%, and a value of the average surface roughness Ra is preferably not more than 90 nm.

Anti-reflection moldings that are used in outdoor environments require a greater anti-reflection effect and desirably have smaller average surface roughnesses Ra in comparison with anti-reflection moldings that are used in indoor environments. A reason why such a great anti-reflection effect is required is as follows. It is lighter outdoors than indoors in the daytime, sunbeams reflected by a surface of a display makes the display difficult to see, and thus a greater anti-reflection effect is required outdoors. For outdoor use, the reflectance is preferably not more than 1.7%, and a value of the average surface roughness Ra is preferably not more than 145 nm.

On condition that an anti-reflection molding is placed and used in front of a display, a color display requires a greater anti-reflection effect and desirably involves a smaller average surface roughness Ra of the molding in comparison with a monochrome display. If much reflection is caused by a screen of the color display, an image on the display looks as if the image is discolored and has a low chroma. Thus, a chroma is more important for a color screen than for a monochrome screen, and a color screen therefore requires greater anti-reflection effect. For a color screen, reflectance is preferably not more than 1.2% and a value of the average surface roughness Ra is preferably not more than 130 nm.

Depending on uses of the anti-reflection molding 8, a distinction may be made on a surface of the molding between an area where a great anti-reflection function is particularly required and an area where a little decrease in anti-reflection function causes no noticeable issues. FIG. 15 is a perspective view illustrating the anti-reflection molding 8 that is used in a full-color liquid crystal display section of a portable telephone and that is 25 mm long and 33 mm wide, as an example. In the anti-reflection molding 8 for such a use, a central area CA is a region a user of the portable telephone watches most carefully, in other words, a visual recognition area in the transparent window, and therefore is an area that particularly requires an anti-reflection function and that desirably has an average surface roughness Ra between 2 and 35 nm. By contrast, a marginal area CB is a periphery of the central area CA and that is a margin of the liquid crystal display section, in other words, a peripheral visual recognition area on a periphery of the visual recognition area in the transparent window is not s region a user of the portable telephone watches carefully. The area CB therefore does not require so a high degree of an anti-reflection function, an average surface roughness Ra on the order of 35 to 85 nm causes no particular issues, and thus time and effort for process can be saved with regard to the marginal area CB in comparison with the central area CA, so that a cost as a whole can be reduced.

The smaller a radius R of curvature of a surface shape of the anti-reflection molding 8, the lower a degree of necessity for an anti-reflection function. In addition, difficulty in production increases, for example, in that it is made difficult to perform a process of polishing a surface of a metal mold 10 for molding to decrease a surface roughness thereof and in that it is made difficult to form the anti-reflection layer 5 with a uniform thickness. In an area where the radius R of curvature of the surface shape of the anti-reflection molding 8 is small, accordingly, the average surface roughness Ra is preferably decreased, for example, so as to be on the order of 85 to 140 nm. Unless any particular issues occur, the anti-reflection function therein may be omitted thoroughly. Provided that the surface shape of the anti-reflection molding 8 shown in FIG. 15 has a sectional shape shown in FIG. 16, for example, there is little possibility that a user of the portable telephone may carefully watch extremely small area CB having a radius R of curvature of smaller than 40 mm, and it is difficult to provide the area with a high degree of an anti-reflection function.

Herein, "average surface roughness Ra" refers to an average surface roughness Ra that can be determined, as shown in FIG. 9, by obtainment of a mean line from a cross-sectional profile curve of a surface of a molding and with use of Gaussian filter (a roughness curve is obtained by subtraction of the mean line from the cross-sectional profile curve).

For a shape of the anti-reflection molding 8, it is important that a shape of a transparent window as a surface requiring an anti-reflection effect is configured so as to have a curved surface having a radius of curvature of not less than 40 mm or a flat surface.

A test was conducted on an order on (equal to) or above which flatness of shapes of moldings has to be for formation of the anti-reflection layer 5 with a uniform thickness and, as shown in Table 3, it was found that at least a surface thereof has to be set so as to be a curved surface having a radius of curvature of not less than 40 mm. It was also found that a curved surface with a radius of curvature of not less than 60 mm is preferably provided. As shown in FIG. 12, anti-reflection moldings 8 were made by production of semi-cylindrical moldings having radii of curvature of between 30 and 300 mm and by subsequent formation thereon of anti-reflection layers 5 made of MgF, mean reflectances of the moldings at 550 nm were measured, and the mean reflectances of not more than 3% were evaluated as being satisfactory, while the mean reflectances of not more than 1% were evaluated as being extremely satisfactory.

In formation of the anti-reflection layer 5 by application of paint having a low viscosity, such a configuration as described above can prevent flow and accumulation of the paint from a high position to a low position, and thus can prevent unevenness in thickness of the anti-reflection layer 5. In formation of the anti-reflection layer 5 by performing an evaporation method, such a configuration can prevent variation with place in a quantity of deposit of deposition vapor per unit area, and thus can prevent unevenness in thickness of the anti-reflection layer 5.

Herein, "radius of curvature" refers to a radius of a circle obtained by determination of an arc that most approximates the mean line found by the roughness measuring apparatus described above and then by extension of the arc (see FIG. 9). Provided that values of radius of curvature greatly vary with measuring areas, a mean value of the values is used.

The surface of the anti-reflection molding 8 desirably has a hard-coat property and, therefore, the hard-coat layer 4 is provided desirably before the anti-reflection layer 5 is formed, as shown in FIG. 1A.

Among methods of forming the hard-coat layer 4 on a surface of the transparent substrate 1 are a method in which a hard-coat agent is applied directly onto the surface of the transparent substrate 1, a molding in-mold decorating method, and the like. In accordance with the molding in-mold decorating method, in particular, a surface of the hard-coat layer 4 can be finished so as to have a shape of a mirror surface or similar cavity surface that is a slightly uneven surface, and unevenness can be lessened considerably. A molding in-mold decorating method in which the hard-coat layer 4 remaining unhardened or half-hardened on the decorating sheet 9 is made into a molding and is thereafter hardened, is further preferable because the molding can easily be formed into the same shape as the cavity surface of the metal mold 10 and because occurrence of cracks during a molding process is thereby lessened.

In order to provide the hard-coat layer 4 or the like on the transparent substrate 1, it is preferable to use a molding in-mold decorating method that makes use of the decorating sheet 9. The molding in-mold decorating method includes a molding in-mold transferring method using a transfer member 9A as the decorating sheet 9 or an inserting method using an insert member as the decorating sheet 9.

The molding in-mold transferring method is such a method as follows. The transfer member 9A in which transfer layers composed of the hard-coat layer 4 and the like have been formed on the substrate sheet 7 is interposed into the metal mold 10 (see FIG. 3B); molten resin 1A is injected into the metal mold 10; simultaneously with obtainment of a resin molding by cooling, the transfer member 9A is bonded onto a surface of the molding (see FIG. 6); the substrate sheet 7 is subsequently peeled off; and the transfer layers are transferred onto a surface of the resin molding to make decoration (see FIG. 7).

The inserting method is such a method as follows. The insert member 9 in which the hard-coat layer 4 and the like have been formed on the substrate sheet 7 is interposed into the metal mold 10; molten resin 1A is injected into the metal mold 10; and, simultaneously with obtainment of a resin molding 100 by cooling, the insert member 9 is bonded onto a surface of the molding to make decoration (see FIG. 3A).

The molding in-mold transferring method that makes use of the transfer member 9A will be described initially.

In the transfer member 9A, the transfer layers composed of the hard-coat layer 4 and the like are provided on the substrate sheet 7 (see FIG. 6). Preferably, not all the layers that are to be formed on the transparent substrate 1 of the anti-reflection molding 8 are incorporated into the transfer layers but only layer(s) suitable for formation by the molding in-mold transferring method are the transfer layer(s), and other layers are formed separately. The hard-coat layer 4, a patterned layer, and the like are particularly suitable for formation by the molding in-mold transferring method.

As material of the substrate sheet 7 may be used material that is used as a substrate sheet for a conventional transfer member, for example, a resin sheet of polypropylene resin, polyethylene resin, polyamide resin, polyester resin, acrylic resin, polyvinyl-chloride resin or the like.

Provided that peelability of the transfer layers from the substrate sheet 7 is satisfactory, the hard-coat layer 4 may be provided directly on the substrate sheet 7. In order to improve the peelability of the transfer layers from the substrate sheet 7, a mold release layer 3 may be formed before the hard-coat layer 4 is provided on the substrate sheet 7 (see FIG. 6). By mixing silica beads or the like into the mold release layer 3, in particular, minute projections and depressions can be formed on the surface of the molding when the substrate sheet 7 is peeled off (see FIG. 7).

Subsequently, the hard-coat layer 4 is formed. The hard-coat layer 4 becomes a layer that increases a surface strength of the anti-reflection molding 8 when the substrate sheet 7 is peeled off after the molding in-mold transfer.

For the hard-coat layer 4 may be used thermosetting resin, resin curable by ionizing radiation such as ultraviolet ray or electron beam, or the like. Used a lot are ultraviolet curable resins such as acrylic-urethane-based one.

Ultraviolet curable resins include ultraviolet curable acrylic urethane resin, ultraviolet curable polyester acrylate resin, and ultraviolet curable epoxy acrylate resin and are used with a photoinitiator. For example, ultraviolet curable acrylic urethane resin is obtained by reaction of polyester polyol with isocyanate monomer or prepolymer and by reaction of a resultant product with acrylate or methacrylate monomer having hydroxyl groups. As the photoinitiator may be used benzophenones, acetophenones, anthraquinone derivatives or the like singly or in combination. For improving formation of a coating, thermoplastic acrylic resin or the like may appropriately be selected and blended with ultraviolet curable resin.

Among methods of forming the hard-coat layer 4 are coating such as gravure coating, roll coating, and comma coating, and a printing process such as gravure and screen printing.

As occasion demands, a pattern layer 120 may be formed (see FIG. 1C). The pattern layer 120 is a layer for decorating the anti-reflection molding 8. The pattern layer 120 is formed on the hard-coat layer 4. In ordinary cases, the pattern layer 120 is formed as a print layer. As material of the print layer is preferably used colored ink that contains as binder such resin as polyvinyl resin, polyamide resin, polyester resin, acrylic resin, polyurethane resin, polyvinyl acetal resin, polyesterurethane resin, cellulose ester resin, and alkyd resin and that contains, as a coloring agent, pigment or dye with an appropriate color. As methods of forming the print layer, a conventional printing process such as offset printing, gravure, screen printing or the like is preferably employed. In ordinary cases, the print layer is partially provided so as to be shaped like a frame, a letter, or the like in a pattern excluding the transparent window.

The pattern layer 120 may be composed of a metal thin film layer or a combination of a print layer and a metal thin film layer. The metal thin film layer is intended for expressing metallic luster in the pattern layer 120 and is formed by performing vacuum deposition, a sputtering technique, ion plating, plating, or the like. Metal such as aluminum, nickel, gold, platinum, chromium, iron, copper, tin, indium, silver, titanium, lead, and zinc; or an alloy or compound of these metals is used in accordance with a desired color of metallic luster that is to be expressed. In ordinary cases, the metal thin film layer is formed partially. When the metal thin film layer is provided, a pre-anchor layer and/or a post-anchor layer may be provided for improving adhesion to other layer(s).

An adhesive layer 2 is preferably formed for bonding the above-mentioned layers onto the transparent substrate 1 (see FIGS. 6, 7, and 8). For the adhesive layer 2 is appropriately used a heat-sensitive or pressure-sensitive resin suitable for material of the transparent substrate 1.

Provided that the material of the transparent substrate 1 is acrylic resin, for example, acrylic resin is preferably used. Provided that the material of the transparent substrate 1 is polyphenylene oxide polystyrene resin, polycarbonate resin, or polystyrene blend resin, preferably used is acrylic resin, polystyrene resin, polyamide resin, or the like that has an affinity for the above resins. Provided that the material of the transparent substrate 1 is polypropylene resin, it is possible to use chlorinated polyolefin resin, chlorinated ethylene vinyl acetate copolymer resin, cyclized rubber, or coumarone-indene resin. Among methods of forming the adhesive layer 2 are coating such as gravure coating, roll coating, or comma coating; or a printing process such as gravure or screen printing.

A configuration of the transfer layers is not limited to the above-mentioned manner. With use of material of the pattern layer that is excellent in terms of adhesiveness with respect to the transparent substrate 1, for example, the adhesive layer 2 may be omitted.

With use of such an anti-reflection transfer member configured as described above, use of a transfer process may be made so that the anti-reflection molding 8 can be obtained easily.

A side of the anti-reflection transfer member having the adhesive layer 2 is initially brought into intimate contact with a surface of the transparent substrate 1. With use of a transferring machine such as roll transferring machine, and an up-down transferring machine that is provided with a heat-resistant-rubber-like elastic body of silicone rubber or the like, subsequently, heat and pressure are applied from a side of the anti-reflection transfer member having the substrate sheet 7 through the heat-resistant-rubber-like elastic body provided with a condition of a temperature on the order of 80 to 260° C., and of a pressure on the order of 490 to 1960 Pa. By this process, the adhesive layer 2 is bonded onto the surface of the transparent substrate 1.

Finally, the substrate sheet 7 is peeled off after being cooled, exfoliation (peeling) is then caused at an interface surface between the substrate sheet 7 and the hard-coat layer 4, and the transfer is completed. Provided that the mold release layer 3 has been provided on the substrate sheet 7, peeling the substrate sheet 7 causes exfoliation at an interface surface between the mold release layer 3 and the hard-coat layer 4 and completes the transfer (see FIGS. 7 and 8).

There will now be described processes of performing the molding in-mold transferring method by injection molding with use of the above-mentioned anti-reflection transfer member.

There is used the metal mold 10 for molding that has a curved surface with a radius of curvature of not less than 40 mm, or a flat surface, in a part of the cavity surface 10A corresponding to the transparent window. As material of the metal mold 10 may be used structural rolled steel, carbon steels for machine structural use, carbon tool steels, alloy tool steels, high-speed steel, high-carbon chromium steel, bearing steels, nickel-chromium-molybdenum steel, chromium-molybdenum steel, aluminum-chromium-molybdenum steel, or the like. The cavity 10B of the metal mold 10 may be formed by performing a machining method such as milling, cold hobbing, a Shaw process, a pressure forging process, electroforming, an electric discharge machining process, an etch machining process, or numerically controlled machining. The cavity surface may be polished with use of file cutting, sandpaper, powder emery, steel wool, rubber grindstone, felt buff, or the like so as to be finished with a specified surface roughness.

In order to vary surface roughnesses of the cavity surface 10A according to areas, it is preferable that methods and degrees of polishing during the finish process are selected appropriately. For example, an overall area may be polished with slightly coarse sandpaper, and a specified area may subsequently be polished again with fine sandpaper, so that two areas having different surface roughnesses may be formed in the cavity surface 10A. As shown in FIG. 17, alternatively, an insert 10f having a metal mold surface polished carefully may be inserted into a metal mold 10d having a rough metal mold surface, and finish fitting may be performed so that two areas having different surface roughnesses may be formed in the cavity surface 10A. For example, the area of the cavity surface 10A polished again with fine sandpaper, or the insert 10f having the metal mold surface polished carefully, may be used in order that the central area CA of the anti-reflection molding 8, i.e., the visual recognition area in the transparent window, may be made and may have an average surface roughness Ra of between 2 and 35 nm. The area of the cavity surface 10A polished only with slightly coarse sandpaper, or the metal mold 10d having the rough metal mold surface, may be used in order that the marginal area CB which is the periphery of the central area CA and is a margin of the liquid crystal display section, i.e., a peripheral visual recognition area on the periphery of the visual recognition area in the transparent window, may be made and may have an average surface roughness Ra on the order of 35 to 85 nm.

In the molding in-mold transferring method, initially, the transfer member 9A that is the decorating sheet 9, is delivered into the metal mold 10 for molding. During this step, sheet-like transfer members 9A may be delivered one by one or required portions of a long-sized transfer member 9A may be delivered intermittently. In the case that the long-sized transfer member 9A is used, a feeder having a positioning device is preferably used so that a pattern layer 120 of the transfer member 9A and the metal mold 10 may be in register. When the transfer member 9A is delivered intermittently, it is convenient to hold the transfer member 9A by a movable mold and a stationary mold after detection of a position of the transfer member 9A by a sensor, in that the transfer member 9A can be held in the same position at any time and in that mis-registration of the pattern layer 120 is prevented.

After closure of the metal mold 10, molten resin 1A is injected from a gate into the metal mold 10 to fill the mold, an object of transfer is formed and, simultaneously with this formation, the transfer member 9A is made to adhere onto a surface of the object.

As resin that may be used for the transparent substrate 1 may be named general-purpose resin such as polystyrene resin, polyolefin resin, ABS resin, AS resin, or AN resin. There also may be used general-purpose engineering resin such as polyphenylene oxide polystyrene resin, polycarbonate resin, polyacetal resin, acrylic resin, polycarbonate denatured polyphenylene ether resin, polybutylene terephthalate resin, or ultragiant molecular weight polyethylene resin; or super engineering resin such as polysulfone resin, polyphenylene sulfide resin, polyphenylene oxide resin, polyarylate resin, polyetherimide resin, polyimide resin, liquid crystalline polyester resin, or polyallyl heat-resistant resin.

The transparent substrate 1 may have entirely a tabular shape or a shape including a two-dimensional or three-dimensional curved surface, as long as the substrate 1 has a concave curved surface having a radius of curvature of not less than 40 mm, or a flat surface, in the transparent window.

A resin molding as the object of transfer is cooled, the metal mold 10 is thereafter opened, and the resin molding is removed therefrom. Finally, the substrate sheet 7 of the transfer member 9A is peeled off (see FIG. 7). Thus only the transfer layers can be transferred to the molding (see FIG. 8).

Hereinbelow, the inserting method using the insert member 9 will be described.

The insert member 9 is preferably obtained by such a method as follows.

For the insert member 9, the hard-coat layer 4, the pattern layer, and the like are provided on the substrate sheet 7 (see FIG. 2).

Preferably used is the substrate sheet 7 similar to that of the transfer member. The hard-coat layer 4, the pattern layer, the adhesive layer 2, and the like can be formed in a manner similar to those of the transfer member.

The inserting method in which the substrate sheet 7 is neither peeled off nor removed allows formation of the hard-coat layer 4 on one surface of the substrate sheet 7 and formation of the pattern layer and the adhesive layer 2 on another surface, or allows formation of the hard-coat layer 4 and the pattern layer on one surface and formation of the adhesive layer 2 on the other surface.

Preferably, not all the layers that are to be formed on the transparent substrate 1 are formed by the inserting method, but only layers suitable for formation by the inserting method are formed by the molding in-mold decorating method, and other layer(s) are formed separately.

Hereinbelow, a method of using the insert member 9 will be described.

There is used the metal mold 10 that has a curved surface having a radius of curvature of not less than 40 mm, or a flat surface, in an area of the cavity surface 10A corresponding to the transparent window. As for the insert member 9, minute projections and depressions cannot be formed by the mold release layer 3, and therefore, minute projections and depressions are preferably formed on the area of the cavity surface 10A of the metal mold 10 corresponding to the transparent window (see FIG. 3A and FIG. 11). In particular, an average surface roughness Ra in the area of the cavity surface 10A corresponding to the transparent window is preferably between 2.0 and 170 nm, because an average surface roughness Ra of the interface between the anti-reflection layer 5 that is to be formed later and the transparent window can be set between 2.0 and 150 nm.

Figure 3A:
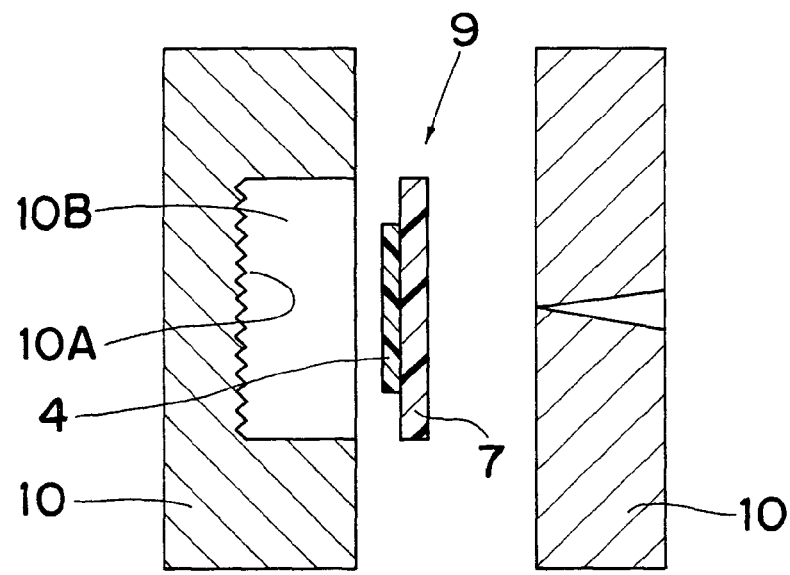
FIGS. 3A and 3B are sectional views illustrating a step in the method of manufacturing the anti-reflection molding of the first embodiment of the present invention.
Figure 3B:
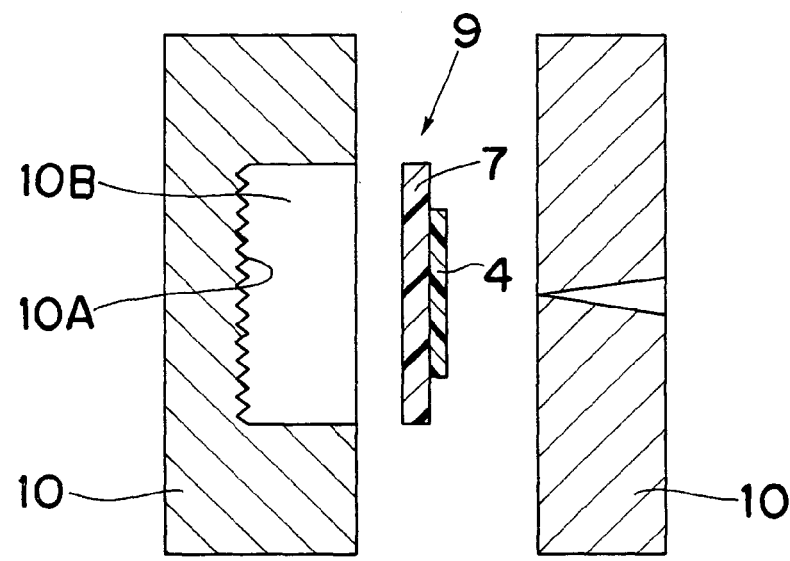
Figure 4:
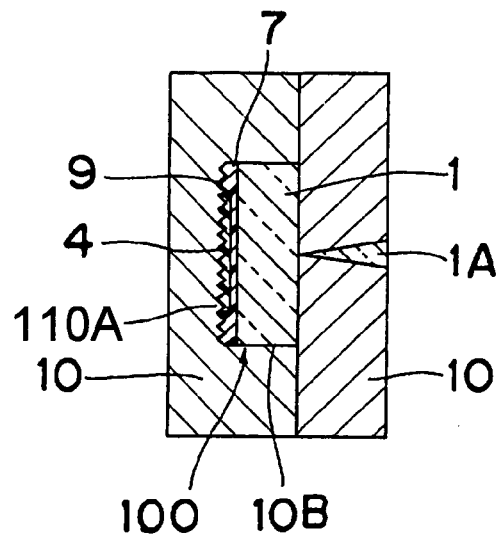
FIG. 4 is a sectional view illustrating a step in the method of manufacturing anti-reflection moldings of the first embodiment of the present invention.

Initially, the insert member 9 that is the decorating sheet 9 is delivered into the metal mold 10 (see FIGS. 3A and 3B). In this step, sheet-like insert members 9 are preferably delivered one by one. Provided that a molding shape is three-dimensional, the insert member 9 may be heated and softened by a heat source and may be brought into intimate contact with the cavity surface 10A by vacuum suction. Then the mold is clamped and molten resin 1A is injected from the gate (see FIG. 4). When the mold is opened, a molding in which the insert member 9 and the molding resin 1A are integrated is obtained (see FIG. 5).

Figure 5:
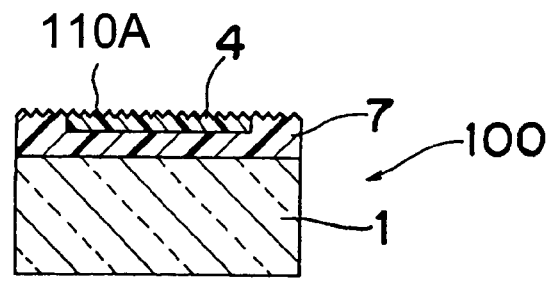
FIG. 5 is a sectional view illustrating a step in the method of manufacturing anti-reflection moldings of the first embodiment of the present invention.

In this manner, the insert member 9 and the molding resin 1A are integrated to form a molding having a transparent window that has an average surface roughness Ra of between 2.0 and 150 nm, and that has a concave curved surface with a radius of curvature of not less than 40 mm, or a flat surface (see FIG. 5).

After the hard-coat layer 4 is formed with use of the decorating sheet 9 of the transfer member or the insert member, the anti-reflection layer 5 is formed at least on the transparent window (see FIGS. 1A and 1B). Reflection from the transparent substrate 1 can be prevented by provision of the anti-reflection layer 5.

As material of the anti-reflection layer 5 may be used: a vapor deposited layer of a metal compound such as $Al_2O_3$, $ZnO_2$, or $MgF_2$; a vapor deposited layer in which a metal compound having a low index of refraction such as $SiO_2$ or $MgF_2$ and a metal compound having a high index of refraction such as $ZnO_2$ or $TiO_2$ are laminated; a resin coating layer composed of fluoropolymer, silicon oxide gel, or the like; or the like. A combination of these materials may be used.

Among methods of manufacturing the anti-reflection layer 5 are a vacuum deposition method, a sputtering technique, ion plating, and the like. There also is a method in which the anti-reflection layer 5 is obtained by application of an organic metal compound such as metal alcoholate or metal chelate onto the transparent substrate 1 by performing a dipping method, a printing process, a coating process, or the like, and subsequent formation of a metal oxide film by performing photoirradiation or drying.

Figure 23:
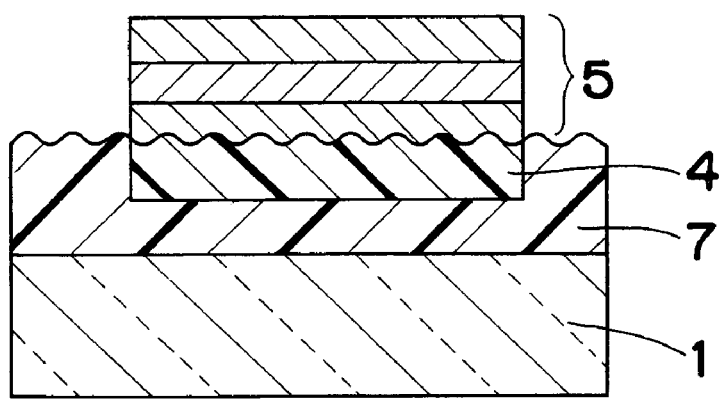
FIG. 23 is a sectional view illustrating the anti-reflection molding of the first embodiment of the present invention, for comparison with the anti-reflection molding of the second embodiment of the present invention.

The anti-reflection layer 5 may be composed of only one layer having a low index of refraction, or may be composed of a plurality of anti-reflection layers that will be described later (see FIG. 23) and that is a complex layer of layer(s) with a low index of refraction and layer(s) with a high index of refraction. Use of the complex layer may improve an anti-reflection property. In order to cancel an increase in number of man-hours that may result from use of the complex layer, it is extremely efficient to form the anti-reflection layer 5 by performing a roll-to-roll continuous coating process. For such a transfer member as in the embodiment, roll-to-roll continuous production can be achieved. Herein, "low index of refraction" and "high index of refraction" are defined by a result of comparison with an index of refraction that a layer residing under those layers has. As for the anti-reflection layer 5 composed of one layer, for example, a basis of the comparison is an index of refraction that the hard-coat layer 1 has. As for the anti-reflection layer 5 having the complex layer, a basis of the comparison is an index of refraction of a layer that resides directly under each layer constituting the anti-reflection layer 5.

Preferably, a film thickness of the anti-reflection layer 5 is appropriately selected so as to satisfy a general expression $nd=\lambda/4$, or a general expression $nd=3\lambda/4$ (wherein n is an index of refraction of a substance with a low index of refraction, d is a film thickness of the substance with the low index of refraction, and $\lambda$ is a low reflection central wavelength). In ordinary cases, the thickness of the anti-reflection layer 5 is in a range of 0.01 to 2 μm.

As occasion demands, an anti-fouling layer 190 may be provided on the anti-reflection layer 5 (see alternate long and short dash lines in FIGS. 1A, 1B, and 1C). The anti-fouling layer 190 is a layer that is provided on the anti-reflection layer 5 for preventing contamination of the anti-reflection molding 8, and that is composed of material having water-repellency and oil-repellency. For the anti-fouling layer 190 is preferably used a surface active agent having fluorine in end groups, or the like. The anti-fouling layer 190 is preferably provided by performing a coating process, a dipping method, a vacuum deposition method, or the like. It is preferable for a thickness of the anti-fouling layer 190 to be as small as possible. A reason for this is that a light transmittance of the anti-reflection molding 8 decreases with increase in the thickness of the anti-fouling layer 190.

Hereinbelow, more concrete examples of the first embodiment will be described as working examples.

WORKING EXAMPLES 1 THROUGH 9

Polycarbonate film with a thickness of 50 μm was used as a substrate sheet, a hard-coat layer with a thickness of 4 μm was formed thereon with use of urethane acrylate resin, and an insert member was thereby obtained (see FIG. 2).

Then various injection metal molds were produced that had average surface roughnesses Ra of between 0.002 and 0.19 μm in an area corresponding to a transparent window, the insert member was loaded into each metal mold, the metal molds were closed, acrylic resin was injected, and obtained were moldings that had unevenness of various degrees on surfaces of the hard-coat layers.

The moldings had a shape of a flat plate that measured 60 mm by 60 mm by 1.5 mm.

An anti-reflection layer of magnesium fluoride with a thickness of about 0.1 μm was then formed on the hard-coat layer of each molding and anti-reflection moldings were thereby obtained (see FIG. 11).

In measurement of reflectances of the anti-reflection moldings thus obtained, working examples 1 through 6 exhibited an anti-reflection property of high degrees and, in particular, the working examples 1 through 5 were highly excellent. Working examples 7 and 8 exhibited an anti-reflection effect that was of some degree but considerably inferior to that of the working examples 1 through 6. Working example 9 had little anti-reflection effect.

TABLE 1

| | Surface roughness of metal mold (nm) | Surface roughness of hardcoat layer (nm) | Thickness of anti-reflection layer (nm) | Reflectance (%) | Evaluation |
|---|---|---|---|---|---|
| Working Example 1 | 2 | 2 | 100 ± 0 | 0.2 | ⊚ |
| Working Example 2 | 10 | 9 | 100 ± 0 | 0.2 | ⊚ |
| Working Example 3 | 30 | 28 | 90 ± 0 | 0.2 | ⊚ |
| Working Example 4 | 50 | 44 | 100 ± 10 | 0.3 | ⊚ |
| Working Example 5 | 80 | 71 | 110 ± 10 | 0.4 | ⊚ |
| Working Example 6 | 110 | 100 | 100 ± 10 | 0.9 | ○ |
| Working Example 7 | 150 | 130 | 100 ± 20 | 2.1 | Δ |
| Working Example 8 | 170 | 150 | 110 ± 20 | 3.1 | Δ |
| Working Example 9 | 190 | 180 | 100 ± 50 | 5.4 | x |

Herein, evaluation "⊚" designates "excellent", "O" designates "good", "Δ" designates "fair", and "x" designates "failure".

WORKING EXAMPLES 10 THROUGH 18

Polyester film with a thickness of 38 μm was used as a substrate sheet, a mold release layer with an average surface roughness Ra of between 0.002 and 0.19 μm was formed thereon with use of melamine resin in which eight parts by weight of silica beads having particle sizes of between 0.4 and 8 μm were added to 100 parts of main ingredient, a hard-coat layer with a thickness of 4 μm was formed thereon with use of urethane acrylate resin, an adhesive layer was formed thereon with use of acrylic resin, and various transfer members were thereby obtained (see FIG. 2).

Each transfer member was placed on a molding of acrylic resin having a shape of a flat plate that measured 60 mm by 60 mm by 1.5 mm, a pressure was applied thereto from a backside by a heating roller, the substrate sheet was peeled off, and obtained were moldings of which surfaces were laminated with the hard-coat layers having unevenness of various degrees.

Subsequently, an anti-reflection layer of magnesium fluoride with a thickness of about 0.1 μm was then formed on the hard-coat layer of each molding and various anti-reflection moldings were thereby obtained.

In measurement of reflectances of the anti-reflection moldings thus obtained, working examples 10 through 15 exhibited an anti-reflection property of high degrees and, in particular, the working examples 10 through 14 were highly excellent. Working examples 16 and 17 exhibited an anti-reflection effect that was of some degree but considerably inferior to that of the working examples 10 through 15. Working example 18 had little anti-reflection effect.

TABLE 2

| | Particle size of beads (μm) | Surface roughness of mold release layer (nm) | Surface roughness of hardcoat layer (nm) | Thickness of anti-reflection layer (nm) | Reflectance (%) | Evaluation |
|---|---|---|---|---|---|---|
| Working Example 10 | No addition | 10 | 10 | 100 ± 0 | 0.2 | ⊚ |
| Working Example 11 | 0.4 | 10 | 10 | 100 ± 0 | 0.2 | ⊚ |
| Working Example 12 | 0.6 | 30 | 30 | 90 ± 0 | 0.2 | ⊚ |
| Working Example 13 | 1.0 | 50 | 50 | 100 ± 0 | 0.3 | ⊚ |
| Working Example 14 | 2.0 | 80 | 70 | 110 ± 10 | 0.4 | ⊚ |
| Working Example 15 | 3.0 | 110 | 100 | 100 ± 10 | 0.9 | ○ |
| Working Example 16 | 5.0 | 140 | 130 | 100 ± 20 | 2.1 | Δ |
| Working Example 17 | 6.0 | 170 | 150 | 110 ± 30 | 3.1 | Δ |
| Working Example 18 | 8.0 | 190 | 180 | 100 ± 60 | 5.4 | x |

(Working Examples 19 through 27)

The insert member used in the working example 1 was used and loaded into an injection metal mold (see FIG. 10), the metal mold was closed, acrylic resin was injected, and manufactured were a molding having a shape of a flat plate that measured 60 mm by 60 mm by 1.5 mm, and moldings having semicylindrical shapes with radii of curvature of between 30 and 300 mm (see FIG. 12). Cavity surfaces of the injection metal molds were designed so that average surface roughnesses Ra of all the moldings were on the order of 0.01 μm.

Subsequently, anti-reflection layers of magnesium fluoride with a thickness of about 0.1 μm were formed on hard-coat layers of the moldings, and anti-reflection moldings were thereby obtained.

TABLE 3

| | Shape of molding | Thickness of anti-reflection layer (%) | Mean reflectance (%) | Evaluation |
|---|---|---|---|---|
| Working Example 19 | Flat plate 60 mm by 60 mm | 110 ± 0 | 0.2 | ⊚ |
| Working Example 20 | Semi-cylinder radius of curvature 300 mm | 90 ± 0 | 0.2 | ⊚ |
| Working Example 21 | Semi-cylinder radius of curvature 180 mm | 90 ± 0 | 0.2 | ⊚ |
| Working Example 22 | Semi-cylinder radius of curvature 120 mm | 110 ± 10 | 0.3 | ⊚ |
| Working Example 23 | Semi-cylinder radius of curvature 90 mm | 100 ± 10 | 0.4 | ⊚ |
| Working Example 24 | Semi-cylinder radius of curvature 60 mm | 100 ± 20 | 0.9 | ○ |
| Working Example 25 | Semi-cylinder radius of curvature 50 mm | 90 ± 20 | 1.6 | Δ |
| Working Example 26 | Semi-cylinder radius of curvature 40 mm | 100 ± 30 | 2.9 | ⊚ |
| Working Example 27 | Semi-cylinder radius of curvature 30 mm | 110 ± 50 | 4.8 | ⊚ |

In measurement of reflectances of the anti-reflection moldings thus obtained, working examples 19 through 24 exhibited an anti-reflection property of high degrees and, in particular, the working examples 19 through 23 were highly excellent. Working examples 25 and 26 exhibited an anti-reflection effect that was of some degree but considerably inferior to that of the working examples 19 through 24. Working example 27 had little anti-reflection effect.

The present invention adopts such configurations as described above and therefore achieves such effects as follows.

In the method of manufacturing the anti-reflection moldings of the present invention, the decorating sheet having at least the hard-coat layer formed on the substrate sheet is placed so that a side having the substrate sheet comes into contact with a cavity surface of the metal mold that is a curved surface having a radius of curvature of not less than 40 mm, or a flat surface, in an area corresponding to the transparent window, transparent molten resin is injected into the metal mold so that an integrated body of the decorating sheet and the transparent substrate formed of the resin is obtained, the substrate sheet is subsequently peeled off so that a curved surface having a radius of curvature of not less than 40 mm and protruding on the surface side in the transparent window, or a flat surface, is formed with an average surface roughness Ra of between 2.0 and 150 nm in the transparent window, the anti-reflection layer is subsequently formed on the surface side of the transparent substrate, and thus anti-reflection moldings having an excellent anti-reflection effect and hard-coat property can be obtained easily.

The metal mold for the anti-reflection molding of the present invention has a curved surface having a radius of curvature of not less than 40 mm, or a flat surface, in an area corresponding to the transparent window and, therefore, use of the metal mold makes it possible to easily obtain anti-reflection moldings having an excellent anti-reflection effect and hard-coat property.

The anti-reflection molding of the present invention has an excellent anti-reflection effect and hard-coat property because at least the anti-reflection layer is formed on the surface of the transparent substrate, because an interface of the transparent window on which the anti-reflection layer is formed has an average surface roughness Ra of between 2.0 and 150 nm, and because the molding has a curved surface having a radius of curvature of not less than 40 mm and protruding on the surface side, or a flat surface, in the transparent window.

Second Embodiment

A second embodiment of the present invention will be described in detail with reference to the drawings. The second embodiment is intended for providing an anti-reflection transfer member that facilitates formation of an anti-reflection layer with a uniform thickness.

Figure 18:
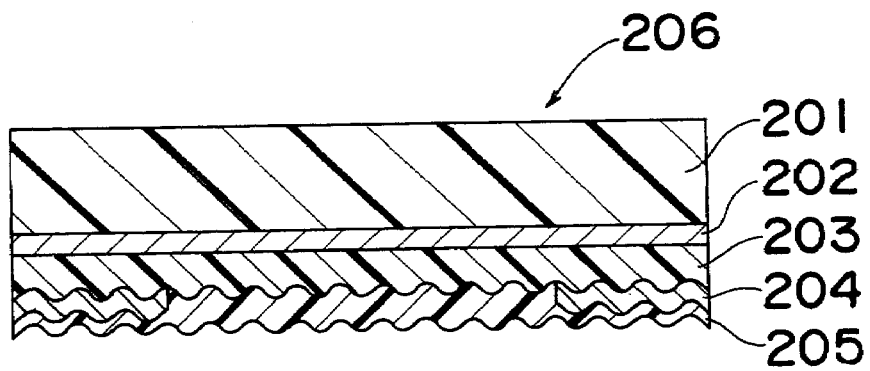
FIG. 18 is a sectional view illustrating an anti-reflection transfer member of a second embodiment of the present invention.
Figure 19:
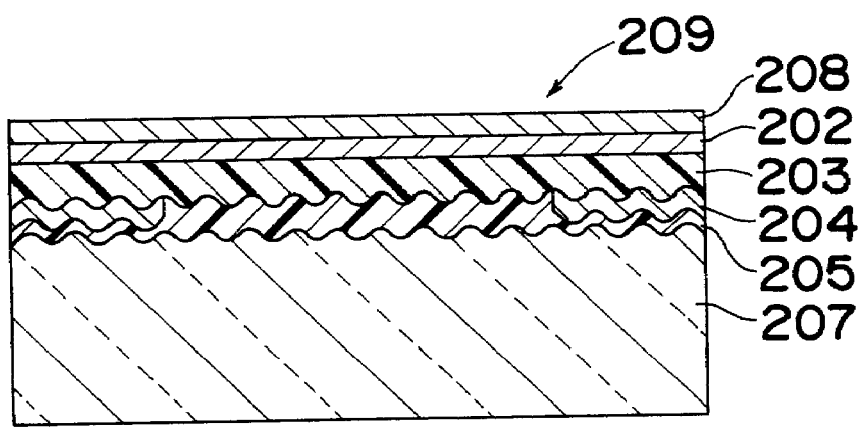
FIG. 19 is a sectional view illustrating an anti-reflection molding manufactured with use of the anti-reflection transfer member of the second embodiment of the present invention.
Figure 20:
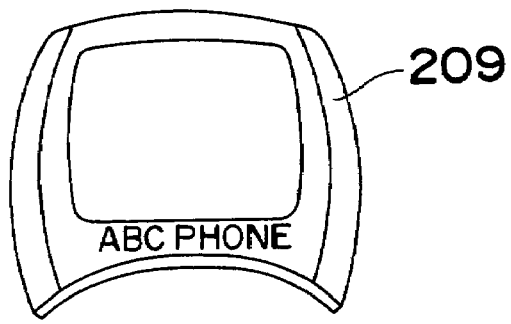
FIG. 20 is a perspective view illustrating an anti-reflection molding manufactured with use of the anti-reflection transfer member of the second embodiment of the present invention.
Figure 21:
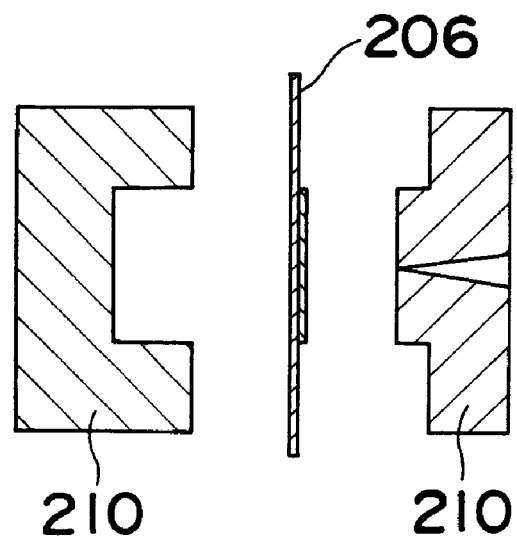
FIG. 21 is a sectional view illustrating a step of manufacturing an anti-reflection molding with use of the anti-reflection transfer member of the second embodiment of the present invention.
Figure 22:
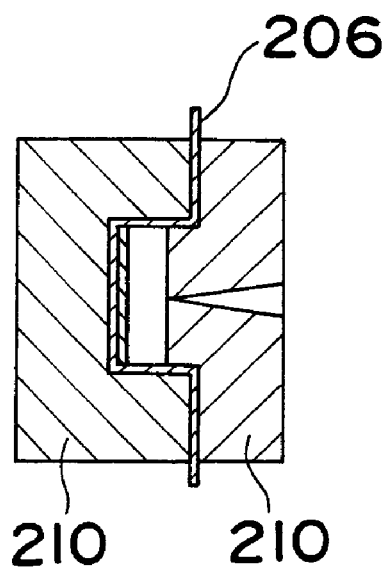
FIG. 22 is a sectional view illustrating a step of manufacturing the anti-reflection molding with use of the anti-reflection transfer member of the second embodiment of the present invention.
Figure 25:
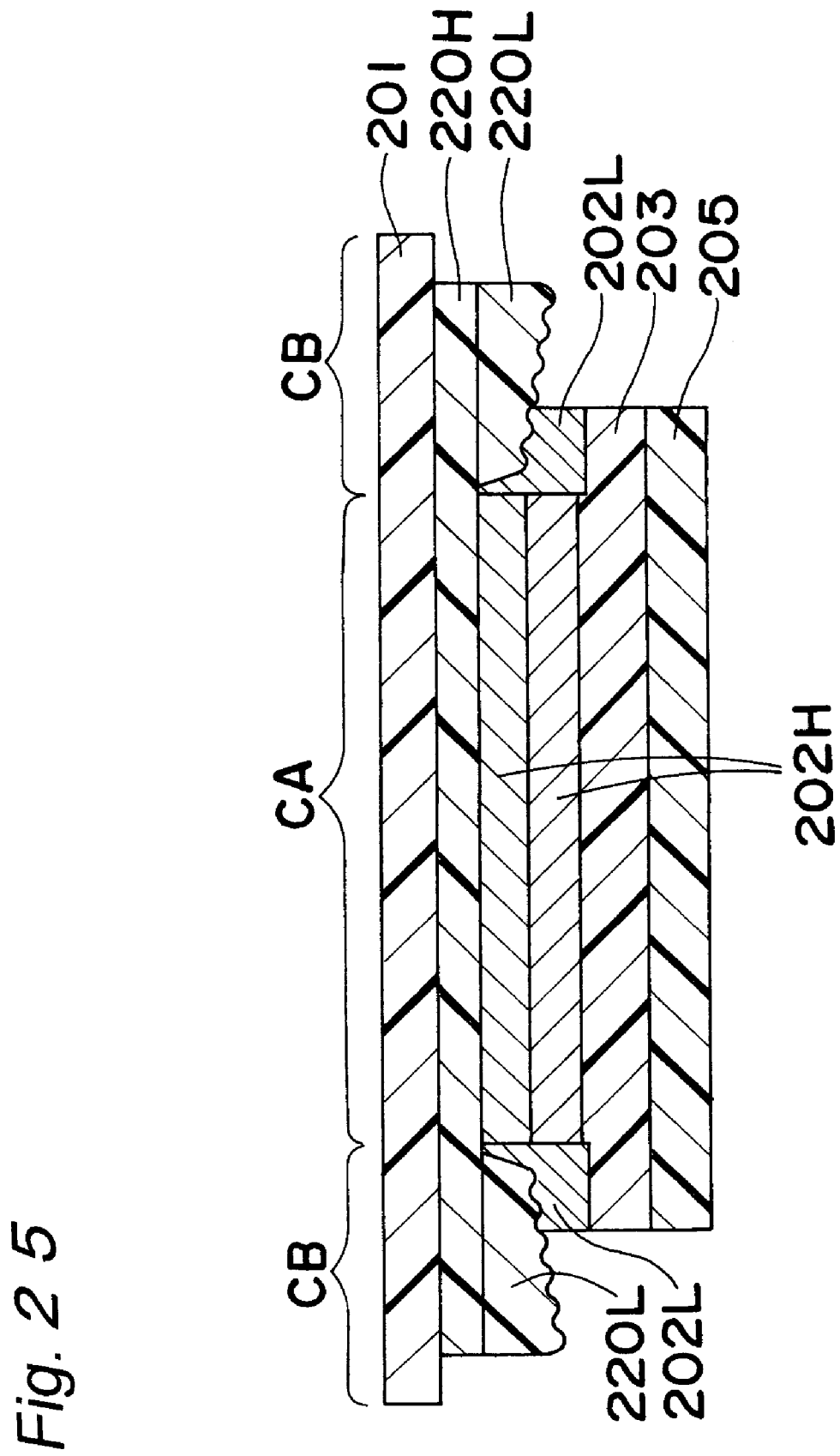
FIG. 25 is a sectional view illustrating an anti-reflection transfer member of the second embodiment of the present invention.

FIG. 18 is a sectional view illustrating an anti-reflection transfer member of the second embodiment of the present invention. FIG. 19 is a sectional view illustrating an anti-reflection molding manufactured with use of the anti-reflection transfer member of the second embodiment of the present invention. FIG. 20 is a perspective view illustrating an anti-reflection molding manufactured with use of the anti-reflection transfer member of the second embodiment of the present invention. FIGS. 21 and 22 are sectional views illustrating steps of manufacturing an anti-reflection molding with use of the anti-reflection transfer member of the second embodiment of the present invention. In the second embodiment, FIG. 15 used in the first embodiment is used also as a perspective view illustrating an anti-reflection molding manufactured with use of the anti-reflection transfer member of the second embodiment of the present invention. FIG. 16 is similarly used as a sectional view illustrating the anti-reflection molding manufactured with use of the anti-reflection transfer member of the second embodiment of the present invention. FIG. 25 is a sectional view illustrating an anti-reflection transfer member of the second embodiment of the present invention.

In the drawings, reference numeral 201 denotes a substrate sheet, numeral 202 denotes an anti-reflection layer, numeral 203 denotes a hard-coat layer, numeral 204 denotes a pattern layer, numeral 205 denotes an adhesive layer, numeral 206 denotes an anti-reflection transfer member, numeral 207 denotes a transparent substrate, numeral 208 denotes an anti-fouling layer, numeral 209 denotes an anti-reflection molding, and numeral 210 denotes a metal mold.

In the anti-reflection transfer member 206 of the second embodiment of the present invention, at least the anti-reflection layer 202 is provided on the substrate sheet 201, directly or with a mold release layer therebetween, and a surface of the substrate sheet 201 or a surface of the mold release layer has an average surface roughness Ra of between 2.0 and 150 nm (see FIG. 18).

For formation of anti-reflection layers 202 with a uniform thickness, the substrate sheet 201 as a foundation is required to have a smoothness. As a result of various tests on smoothness of the substrate sheet 201, as shown in Table 4, it was found that an excellent anti-reflection effect was achieved with the substrate sheet 201 having an average surface roughness Ra of between 2.0 and 150 nm. It is extremely difficult to manufacture the substrate sheet 201 having an average surface roughness Ra of less than 2.0 nm. On condition that the average surface roughness Ra exceeds 150 nm, thicknesses of the anti-reflection layers 202 are made extremely uneven and the anti-reflection effect of the anti-reflection layers 202 is extremely deteriorated. In order that the substrate sheet 201 may have an average surface roughness Ra of between 2.0 and 150 nm, the surface of the substrate sheet 201 is preferably smoothed by mirror press working or the like, or a mold release layer having an excellent leveling property is preferably formed. Preferable average surface roughnesses Ra are between 5.0 and 140 nm. It may be difficult to manufacture the substrate sheet 201 having an average surface roughness Ra of less than 5.0 nm. On condition that the average surface roughness Ra exceeds 140 nm, thicknesses of the anti-reflection layers 202 are made uneven and the anti-reflection effect of the anti-reflection layers 202 may be deteriorated. Further preferable average surface roughnesses Ra are between 5.0 and 80 nm. It was found that a thickness tolerance of the anti-reflection layers 202, and a reflectance of the anti-reflection molding 209 manufactured with use of the anti-reflection transfer member 206, were little changed even if the sheet having an average surface roughness Ra of not more than 35 nm was further smoothed.

In the first embodiment, an uneven interface is positioned inside after the anti-reflection layer 205 is provided (see FIGS. 1A through 1C). In such a structure, unevenness of the surface of the anti-reflection layer 205 decreases with increase in a number of stacked anti-reflection layers 205 (see FIG. 23).

Figure 24:
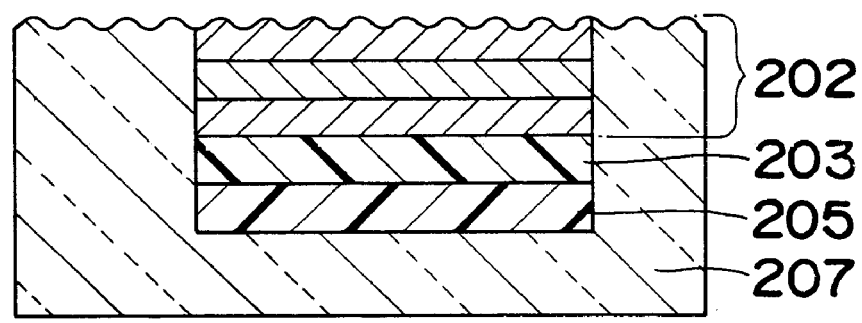
FIG. 24 is a sectional view illustrating the anti-reflection molding of the second embodiment of the present invention.

In the second embodiment, however, an average surface roughness Ra of an outermost surface of the anti-reflection layer 202 is equal to an average surface roughness Ra of the surface of the mold release layer or the substrate sheet, because transfer layers provided with the anti-reflection layers 202 are transferred onto a surface of the molding (see FIG. 24).

The anti-reflection effect is achieved by cancellation of reflected light by interference thereof in interfaces of the anti-reflection layers, and thus an anti-reflection layer that is the nearer to the outermost surface has the greater anti-reflection effect and makes uniformity in film thickness thereof the more important.

Accordingly, an anti-reflection effect that is achieved by the anti-reflection layers provided in the first embodiment on condition that the surface of the hard-coat layer has an average surface roughness Ra of 150 nm is superior to an anti-reflection effect that is achieved by the anti-reflection layers provided in the second embodiment on condition that the outermost surface of the anti-reflection layers has an average surface roughness Ra of 150 nm, as long as materials and film thicknesses are the same.

In order that an anti-reflection effect on the same level as an effect achieved by the anti-reflection layers provided in the first embodiment may be achieved in the second embodiment, therefore, the unevenness has to be decreased for increasing uniformity in thickness.

As a result of tests, 140 nm was an average surface roughness Ra of the outermost surface of the anti-reflection layers of the second embodiment that provided a reflectance of nearly the same value of a reflectance achieved by the anti-reflection layers provided in the first embodiment with the surface of the hard-coat layer having the average surface roughness Ra of 150 nm.

As material of the substrate sheet 201 may be used material that is used as a substrate sheet for a conventional transfer member, for example, a resin sheet of polypropylene resin, polyethylene resin, polyamide resin, polyester resin, acrylic resin, polyvinyl-chloride resin, or the like.

Provided that peelability of the transfer layers from the substrate sheet 201 is satisfactory, the anti-reflection layers 202 may be provided directly on the substrate sheet 201. In order to improve the peelability of the transfer layers from the substrate sheet 201, the mold release layer may be formed before the anti-reflection layers 202 are provided on the substrate sheet 201. The mold release layer is peeled and removed with the substrate sheet 201 from the transfer layers when the substrate sheet 201 is peeled off after molding in-mold transfer. As material of the mold release layer may be used melamine resin mold release agent, silicone resin mold release agent, fluororesin mold release agent, cellulose derivative mold release agent, urea resin mold release agent, polyolefin resin mold release agent, paraffinic mold release agent, complex mold release agent of those agents, or the like. Among methods of forming the mold release layer are coating such as roll coating or spray coating; and a printing process such as gravure or screen printing.

The anti-reflection layers 202 are formed directly on the substrate sheet 201 or on the mold release layer. The anti-reflection layers 202 are layers for preventing reflection from the transparent substrate 207.

As material of the anti-reflection layers 202 may be used: vapor deposited layers of metal compound such as $Al_2O_3$, $ZnO_2$, or $MgF_2$; vapor deposited layers in which a metal compound having a low index of refraction such as $SiO_2$ or $MgF_2$ and a metal compound having a high index of refraction such as $ZnO_2$ or $TiO_2$ are laminated; resin coating layers composed of fluoropolymer, silicon oxide gel, or the like; or the like. A combination of these materials may be used.

Among methods of manufacturing the anti-reflection layers 202 are a vacuum deposition method, a sputtering technique, ion plating, and the like. There also is a method in which the anti-reflection layers 202 are obtained by application of an organic metal compound such as metal alcoholate or metal chelate by performing a dipping method, a printing process, a coating process, or the like and subsequent formation of metal oxide film by performing photoirradiation or drying.

The anti-reflection layers 202 may be composed of only one layer having a low index of refraction or may be composed of complex layer(s) of layer(s) with a low index of refraction and layer(s) with a high index of refraction. Use of the complex layer may improve an anti-reflection property. In order to cancel an increase in number of man-hours for formation of the complex layer, it is extremely efficient to form the anti-reflection layer 202 by performing a roll-to-roll continuous coating process.

Preferably, a film thickness of the anti-reflection layers 202 is appropriately selected so as to satisfy a general expression $nd=\lambda/4$ or a general expression $nd=3\lambda/4$ (wherein n is an index of refraction of a substance with a low index of refraction, d is a film thickness of the substance with the low index of refraction, and $\lambda$ is a low reflection central wavelength). In ordinary cases, the thickness of the anti-reflection layers 202 is in a range of 10 nm to 2.0 μm.

As occasion demands, the hard-coat layer 203 may be provided on the anti-reflection layer 202. In the present invention, the hard-coat layer 203 refers to a layer that has a surface hardness equal to or harder than a pencil hardness of H in measurement by a measuring method of JIS K5400. The layer may be made to remain unhardened or half-hardened (softer than H) on the transfer member 206 and, after being transferred, may be hardened so as to have a pencil hardness of H or harder than H. Once the substrate sheet 201 is peeled off after molding in-mold transfer, the hard-coat layer 203 is made a layer for increasing a surface strength of the anti-reflection molding 209.

For the hard-coat layer 203 may be used thermosetting resin, resin curable by ionizing radiation such as ultraviolet ray or electron beam, or the like. Used a lot are ultraviolet curable resins such as an acrylic-urethane-based one.

Ultraviolet curable resins include ultraviolet curable acrylic urethane resin, ultraviolet curable polyester acrylate resin, and ultraviolet curable epoxy acrylate resin, and are used with a photoinitiator. For example, ultraviolet curable acrylic urethane resin is obtained by reaction of polyester polyol with isocyanate monomer or prepolymer, and by reaction of a resultant product with acrylate or methacrylate monomer having hydroxyl groups. As the photoinitiator may be used benzophenones, acetophenones, anthraquinone derivatives or the like, singly or in combination. For improving formation of coating, thermoplastic acrylic resin or the like may appropriately be selected and blended with ultraviolet curable resins.

Among methods of forming the hard-coat layer 203 are coating such as gravure coating, roll coating, or comma coating; and a printing process such as gravure or screen printing.

As occasion demands, the pattern layer 204 may be formed. The pattern layer 204 is a layer for decorating the anti-reflection molding 209. Provided that the anti-reflection molding 209 is a cover component for a display section, the pattern layer 204 is partially provided so as to be shaped like a frame, a letter, or the like in a pattern excluding the transparent window, in ordinary cases. The pattern layer 204 is formed on the hard-coat layer 203. In normal times, the pattern layer 204 is formed as a print layer. As material of the print layer is preferably used colored ink that contains as binder such resin as polyvinyl resin, polyamide resin, polyester resin, acrylic resin, polyurethane resin, polyvinyl acetal resin, polyesterurethane resin, cellulose ester resin, or alkyd resin and that contains, as coloring agent, pigment or dye that has an appropriate color. As methods of forming the print layer, a conventional printing process such as offset printing, gravure or screen printing; or the like is employed preferably.

The pattern layer 204 may be composed of a metal thin film layer or a combination of a print layer and a metal thin film layer. The metal thin film layer is intended for expressing metallic luster in the pattern layer 204 and is formed by performing a vacuum deposition method, sputtering technique, ion plating, plating, or the like. Metal such as aluminum, nickel, gold, platinum, chromium, iron, copper, tin, indium, silver, titanium, lead, or zinc; or an alloy or compound of these metals is used in accordance with a desired color of metallic luster that is to be expressed. In ordinary cases, the metal thin film layer is formed partially. When the metal thin film layer is provided, a pre-anchor layer and/or a post-anchor layer may be provided for improving adhesion to other layer(s).

Adhesive layers 205 are preferably formed for bonding the above-mentioned layers onto the transparent substrate 207. For the adhesive layers 205 are appropriately used heat-sensitive or pressure-sensitive resin suitable for material of the transparent substrate 207.

Provided that the material of the transparent substrate 207 is acrylic resin, for example, acrylic resin is preferably used for the adhesive layer. Provided that the material of the transparent substrate 207 is polyphenylene oxide polystyrene resin, polycarbonate resin, or polystyrene blend resin, preferably used is acrylic resin, polystyrene resin, polyamide resin, or the like that has an affinity for the above resins. Provided that the material of the transparent substrate 207 is polypropylene resin, it is possible to use chlorinated polyolefin resin, chlorinated ethylene vinyl acetate copolymer resin, cyclized rubber, or coumarone-indene resin. Among methods of forming the adhesive layer 205 are coating such as gravure coating, roll coating, or comma coating; and a printing process such as gravure or screen printing.

A configuration of the transfer layer(s) is not limited to the above-mentioned manner. With use of material of the pattern layer 204 that is excellent in terms of adhesiveness with respect to the transparent substrate 207, for example, the adhesive layer 205 may be omitted.

Depending on uses of the anti-reflection molding 208, a distinction may be made on a surface of the molding between an area where a great anti-reflection function is particularly required and an area where a little decrease in anti-reflection function causes no noticeable issues. FIG. 15 is the perspective view illustrating an anti-reflection molding 208 that is used in a full-color liquid crystal display section of a portable telephone and that is 25 mm long and 33 mm wide. In the anti-reflection molding 208 for such a use, a central area CA is a region a user of the portable telephone watches most carefully, in other words, a visual recognition area in the transparent window, and therefore is an area that particularly requires an anti-reflection function and that desirably has an average surface roughness Ra of between 2 and 35 nm. By contrast, a marginal area CB that is a periphery of the central area CA and is a margin of the liquid crystal display section, in other words, a peripheral visual recognition area on periphery of the visual recognition area in the transparent window is not the region a user of the portable telephone watches carefully, the area CB therefore does not require so high degree of anti-reflection function, and an average surface roughness Ra on the order of 35 to 85 nm causes no particular issues.

The smaller a radius R of curvature of a surface shape of the anti-reflection molding 208, the lower a degree of necessity for anti-reflection function. In an area where the radius R of curvature of the surface shape of the anti-reflection molding 208 is small, accordingly, the average surface roughness Ra is preferably decreased, for example, so as to be on the order of 85 to 140 nm. Unless any particular issues occur, an anti-reflection function may be omitted therein thoroughly. Provided that the surface shape of the anti-reflection molding 208 shown in FIG. 15 has the sectional shape shown in FIG. 16, for example, there is little possibility that a user of the portable telephone may carefully watch the extremely small area CB having a radius R of curvature of smaller than 40 mm.

Accordingly, two or more mold release layers 220 having different average surface roughnesses Ra may be formed in a pattern. On condition that an average surface roughness Ra of a mold release layer 220 has a large value, peeling at an interface between the mold release layer and the anti-reflection layer is made difficult, and faulty peeling called "foil fin" might be caused. In the vicinity of the marginal area CB, as shown in FIG. 25, the average surface roughness Ra may be increased to such a limit that vanishment of the anti-reflection effect is avoided and thicknesses of a mold release layer 220L may be partially increased. Thus, thicknesses of the transfer layers can be made relatively small and occurrence of foil fin in the marginal area CB can be prevented. The above formation is preferably made so that a mold release layer 220H having a small average surface roughness Ra is positioned on the central area CA.

Anti-reflection layers 202 made of different materials may be formed in a pattern (see FIG. 25). In the marginal area CB having a small radius R of curvature that is provided with the anti-reflection layers 202, the anti-reflection layers 202 composed of a metal compound such as magnesium fluoride having no tensibility may suffer cracks. A low-degree anti-reflection layer 202L composed of resin material such as fluororesin, acrylic resin, or urethane resin is preferably formed partially in a pattern in the marginal area CB and high-degree anti-reflection layers 202H composed of a metal compound are preferably formed partially in a pattern in the central area CA. That is because the low-degree anti-reflection layer 202L composed of resin material has a low degree of an anti-reflection effect but has a considerably low risk of causing cracks.

The above configurations may be combined. That is, as shown in FIG. 25, in the central area CA are preferably formed the mold release layer 220H having an average surface roughness Ra on the order of 5 nm that is as small as possible and the high-degree anti-reflection layers 202H composed of a plurality of metal compound layers and having a high degree of an anti-reflection effect, and in the marginal area CB are preferably formed the mold release layer 220L having an average surface roughness Ra on the order of 110 to 140 nm in a range that ensures a minimum anti-reflection effect and the low-degree anti-reflection layer 202L composed of fluororesin that has excellent flexibility.

Alternatively, the mold release layers may be formed neither in the central area CA nor in the marginal area CB, an average surface roughness Ra of the substrate sheet in the central area a may be set at 5 nm that is as small as possible, and a surface roughness Ra of the substrate sheet in the marginal area CB may be set on the order of 110 to 140 nm.

Alternatively, a configuration may be employed that makes use of average surface roughnesses Ra of the substrate sheet and average surface roughness Ra of the mold release layers, in combination.

With use of the anti-reflection transfer member 206 configured as described above, use of a transfer process may be made so that the anti-reflection molding 209 is obtained easily.

A side of the anti-reflection transfer member 206 having the adhesive layer 205 is initially brought into intimate contact with a surface of the transparent substrate 207. With use of a transferring machine such as a roll transferring machine or up-down transferring machine provided with a heat-resistant-rubber-like elastic body of silicone rubber or the like, subsequently, heat and pressure are applied from a side of the anti-reflection transfer member 206 having the substrate sheet 201 through the heat-resistant-rubber-like elastic body provided with a condition of a temperature on the order of 80 to 260° C. and of a pressure on the order of 490 to 1960 Pa. By this process, the adhesive layer 205 is bonded onto the surface of the transparent substrate 207.

Finally, the substrate sheet 201 is peeled off after being cooled, exfoliation is then caused at an interface surface between the substrate sheet 201 and the anti-reflection layers 202, and the transfer is completed. On condition that the mold release layer is provided on the substrate sheet 201, peeling the substrate sheet 201 causes exfoliation at an interface surface between the mold release layer and the anti-reflection layers 202 and completes the transfer. Thus the anti-reflection molding 209 is obtained.

There will now be described a method of obtaining the anti-reflection molding 209 by making use of the molding in-mold transferring method by injection molding with use of the above-mentioned anti-reflection transfer member 206.

As the metal mold 210 for molding, a metal mold for use in injection molding is used.

The anti-reflection transfer member 206 is initially delivered into the metal mold 210 for molding (see FIG. 21). In this step, sheet-like transfer members 206 may be delivered one by one or required portions of a long-sized transfer member 206 may be delivered intermittently. In the case that the long-sized transfer member 206 is used, a feeder having a positioning device is preferably used so that the pattern layer 204 of the transfer member 206 and the metal mold 210 for molding may be in register. When the transfer member 206 is delivered intermittently, it is convenient to hold the transfer member 206 by a movable mold and a stationary mold after detection of a position of the transfer member 206 by a sensor, in that the transfer member 206 can be held in the same position at any time and in that mis-registration of the pattern layer 204 is prevented.

After closure of the metal mold 210 for molding, molten resin is injected from a gate into the metal mold 210 to fill the mold, an object of transfer is formed and, simultaneously with the formation, the transfer member 206 is made to adhere onto a surface of the object (see FIG. 22).

As resin that may be used for the transparent substrate 207 may be named general-purpose resins such as polystyrene resin, polyolefin resin, ABS resin, AS resin, or AN resin. There also may be used general-purpose engineering resin such as polyphenylene oxide polystyrene resin, polycarbonate resin, polyacetal resin, acrylic resin, polycarbonate denatured polyphenylene ether resin, polybutylene terephthalate resin, or ultragiant molecular weight polyethylene resin; or super engineering resin such as polysulfone resin, polyphenylene sulfide resin, polyphenylene oxide resin, polyarylate resin, polyetherimide resin, polyimide resin, liquid crystalline polyester resin, or polyallyl heat-resistant resin. Those molding resins may be mixed with a light diffusing agent composed of silica beads, acrylic beads, or the like; and the like.

The transparent substrate 207 may have a tabular shape or a shape including a two-dimensional or three-dimensional curved surface.

A resin molding as the object of transfer is cooled, the metal mold 210 for molding is thereafter opened, and the resin molding is removed. Finally, the substrate sheet 201 of the transfer member 206 is peeled off. Thus, only the transfer layers are transferred to the molding (see FIGS. 19 and 3).

As occasion demands, the anti-fouling layer 208 may be provided. The anti-fouling layer 208 is a layer that is provided on the anti-reflection layers 202 to prevent contamination of the anti-reflection molding 209, and that is composed of material having water-repellency and oil-repellency. For the anti-fouling layer 208 is preferably used a surface active agent having fluorine in end groups, or the like. The anti-fouling layer 208 is preferably provided by performing a coating process, dipping method, vacuum deposition method, or the like. It is preferable for a thickness of the anti-fouling layer 208 to be as small as possible. That is because a light transmittance of the anti-reflection molding 209 decreases with increase in the thickness of the anti-fouling layer 208.

In the present invention, as described above, on the substrate sheet 201 that is excellent in terms of smoothness, the anti-reflection layers 202 are formed, directly or with the mold release layer therebetween; other layers such as the hard-coat layer 203 are thereafter formed; and thus the anti-reflection layers 202 that have excellent uniformity in terms of thickness can be formed regardless of unevenness of other layers such as the hard-coat layer 203.

Hereinbelow, more concrete examples of the second embodiment will be described as working examples.

Polyethylene terephthalate resin films with various average surface roughnesses Ra shown in Table 4 were used as substrate sheets, each film was coated with melamine resin so that a mold release layer was formed, magnesium fluoride was then deposited thereon to form an anti-reflection layer with a thickness of about 100 nm, a hard-coat layer with a thickness of 4 μm was then formed with use of urethane acrylate resin blended with 5% light diffusion agent, an adhesive layer was then formed with use of acrylic resin, and anti-reflection transfer members were obtained.

Polycarbonate film with a thickness of 50 μm was used as a transparent substrate, was layered on each anti-reflection transfer member, and was bonded with heat and pressure applied from a side having the substrate sheet by a roll transferring machine, then the substrate sheet was peeled off and was removed with the mold release layer, and obtained were anti-reflection moldings that were anti-reflection sheets for display sections of a personal computer.

TABLE 4

| | Substrate sheet | Surface Roughness of substrate sheet (μm) | Thickness of anti-eflection layer (μm) | Re-flectance (%) | Evaluation |
|---|---|---|---|---|---|
| Working Example 31 | 50 μm thick PET film mirror-pressed | 0.005 | 0.09 ± 0.00 | 0.2 | ⊚ |
| Working Example 32 | 50 μm thick PET film (TOYOBO A4100) | 0.012 | 0.11 ± 0.00 | 0.2 | ⊚ |
| Working Example 33 | 25 μm thick PET film (TOYOBO E5001) | 0.035 | 0.10 ± 0.00 | 0.2 | ⊚ |
| Working Example 34 | 25 μm thick PET film (TOYOBO E5007) | 0.052 | 0.11 ± 0.01 | 0.4 | ⊚ |
| Working Example 35 | Film of Working Example 34 coated with melamine resin | 0.080 | 0.10 ± 0.02 | 0.5 | ⊚ |
| Working Example 36 | Melamine resin of Working Example 35 containing 5% matting agent | 0.110 | 0.09 ± 0.03 | 1.0 | ○ |
| Working Example 37 | Melamine resin of Working Example 35 containing 10% matting agent | 0.140 | 0.11 ± 0.04 | 2.1 | Δ |
| Working Example 38 | Melamine resin of Working Example 35 containing 20% matting agent | 0.190 | 0.10 ± 0.05 | 5.1 | x |

Herein, evaluation "⊚" designates "excellent", "O" designates "good", "Δ" designates "fair", and "x" designates "failure".

In measurement of reflectances of the anti-reflection moldings thus obtained, working examples 31 through 35 proved to be highly excellent anti-reflection sheets that had an anti-reflection property of high degree and a hard-coat property. Working example 36 had a little degraded anti-reflection property in comparison with that of the working examples 31 through 35 but had performance sufficient and required for some usage, as shown in FIG. 14. Working example 37 was a little inferior in terms of an anti-reflection effect. Working example 38 was inferior in terms of an anti-reflection effect.

The second embodiment of the present invention adopts such configurations as described above and therefore achieves such effects as follows.

In the anti-reflection transfer member of the second embodiment of the present invention, at least the anti-reflection layer is provided on the substrate sheet, directly or with the mold release layer therebetween, the average surface roughness Ra of the surface of the substrate sheet or the surface of the mold release layer is between 2.0 and 150 nm, and therefore the transfer member has the anti-reflection layers that are excellent in uniformity in terms of thickness. Thus anti-reflection moldings having an excellent anti-reflection effect can be obtained easily, with use of the anti-reflection transfer member.

Third Embodiment

An embodiment of the present invention will be described in detail with reference to the drawings.

The transparent window of the conventional cover component is commonly obtained by formation of a primer layer or a hard-coat layer on a transparent substrate and by formation thereon of a low-reflectance layer.

Figure 31:
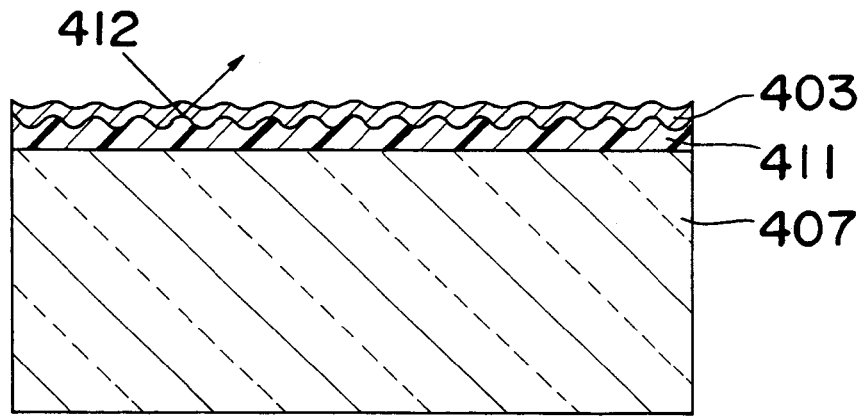
FIG. 31 is a sectional view illustrating a conventional anti-reflection member.

In the cover component obtained by such a method, however, difficulty in forming a smooth surface on a primer layer 411 or a hard-coat layer causes an issue in that diffused reflection (see an arrow 412) occurs at an interface between the surface and a low-reflectance layer 403, and may impair comfort in viewing a liquid crystal panel screen positioned at a back of the cover component (see FIG. 31). Reference numeral 407 denotes a transparent substrate.

The third embodiment is therefore intended for providing an anti-reflection member that obviates such a defect as described above and that has an excellent anti-reflection effect, and for providing a method of manufacturing the same.

That is, the first and the second embodiments are present inventions that are basically based on an object of how to form anti-reflection layers on a surface with a uniform thickness, and the third embodiment is an invention that improves an inner layer structure on basis of an object of how to scatter light having invaded inside, and how to prevent reflection regardless of presence or absence of anti-reflection layers.

Thus, this embodiment is a technique different from the first and the second embodiments, and achievement of anti-reflection performance of a higher degree is therefore expected with use thereof in combination with the first and the second embodiments.

Figure 26:
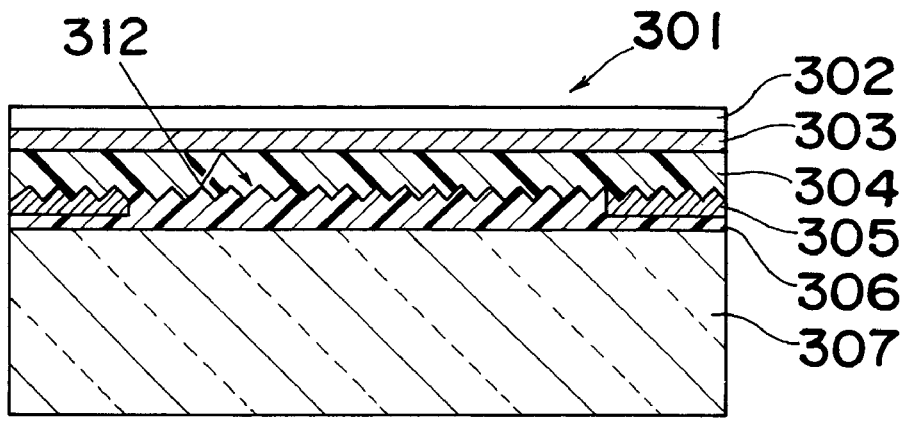
FIG. 26 is a sectional view illustrating an anti-reflection member of a third embodiment of the present invention.
Figure 27:
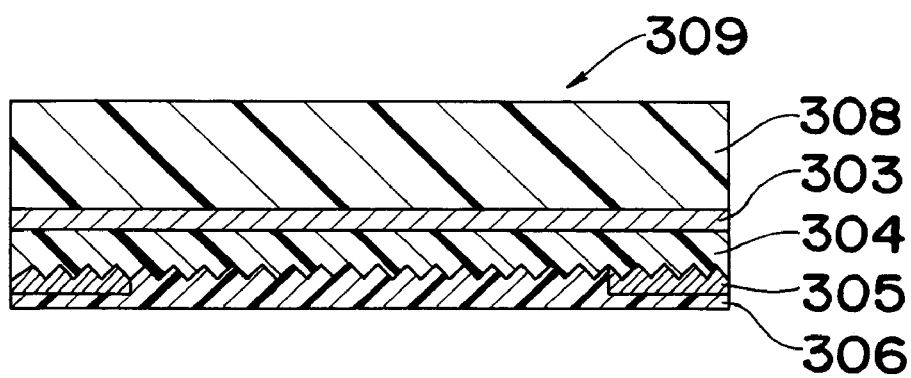
FIG. 27 is a sectional view illustrating a transfer member for use in a method of manufacturing the anti-reflection member of the third embodiment of the present invention.
Figure 28:
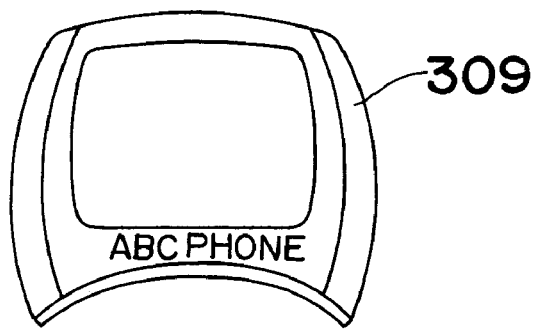
FIG. 28 is a perspective view illustrating an anti-reflection member of the third embodiment of the present invention.
Figure 29:
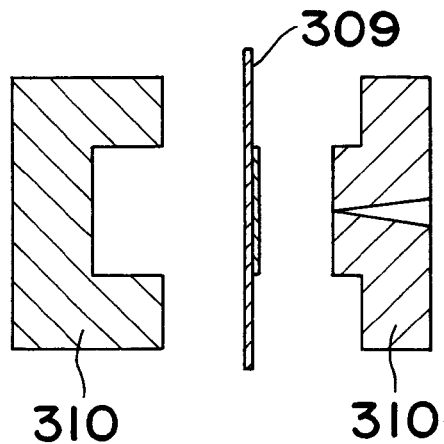
FIG. 29 is a sectional view illustrating a step of the method of manufacturing an anti-reflection member of the third embodiment of the present invention.
Figure 30:
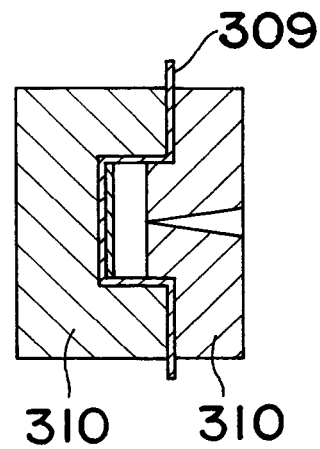
FIG. 30 is a sectional view illustrating a step of the method of manufacturing the anti-reflection member of the third embodiment of the present invention.
Figure 32:
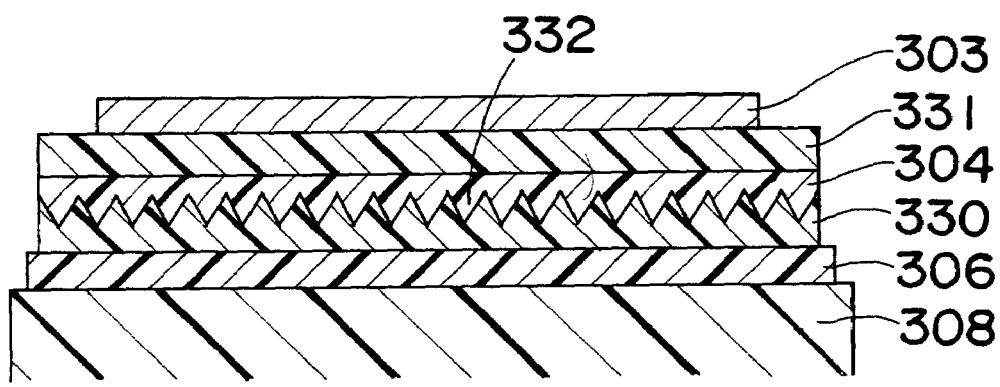
FIG. 32 is a sectional view illustrating an anti-reflection member of the third embodiment of the present invention.
Figure 33:
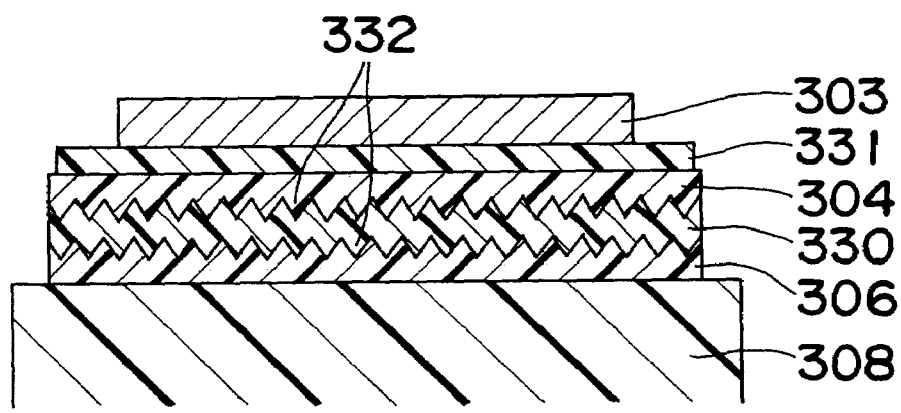
FIG. 33 is a sectional view illustrating an anti-reflection member of the third embodiment of the present invention.
Figure 34:
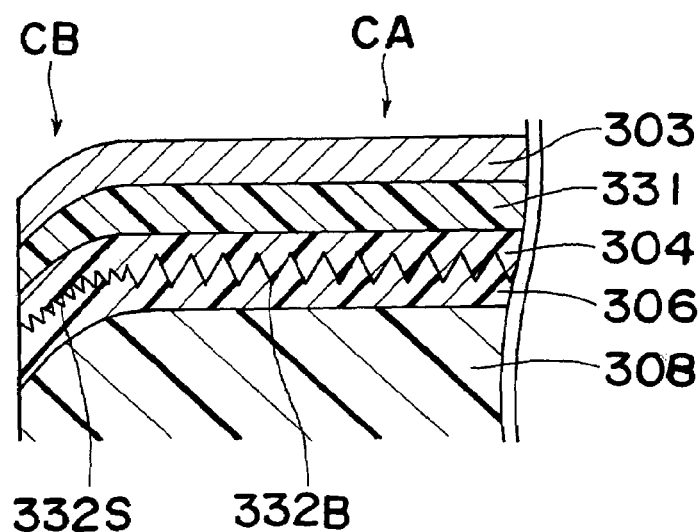
FIG. 34 is a sectional view illustrating an anti-reflection member of the third embodiment of the present invention.

FIG. 26 is a sectional view illustrating an anti-reflection member of the third embodiment of the present invention. FIG. 27 is a sectional view illustrating a transfer member for use in a method of manufacturing the anti-reflection member of the third embodiment of the present invention. FIG. 28 is a perspective view illustrating the anti-reflection member of the third embodiment of the present invention. FIGS. 29 and 30 are sectional views illustrating steps of a method of manufacturing the anti-reflection member of the third embodiment of the present invention. In the third embodiment, FIG. 15 used in the first embodiment is used also as a perspective view illustrating the anti-reflection member of the third embodiment of the present invention. FIG. 16 is used as a sectional view illustrating the anti-reflection member of the third embodiment of the present invention. FIG. 32 is a sectional view illustrating the anti-reflection member of the third embodiment of the present invention. FIG. 33 is a sectional view illustrating the anti-reflection member of the third embodiment of the present invention. FIG. 34 is a sectional view illustrating the anti-reflection member of the third embodiment of the present invention.

In the drawings, reference numeral 301 denotes the anti-reflection member, numeral 302 denotes an anti-fouling layer, numeral 303 denotes a low-reflectance layer, numeral 304 denotes an uneven layer, numeral 305 denotes a pattern layer, numeral 306 denotes an adhesive layer, numeral 307 denotes a transparent substrate, numeral 308 denotes a substrate sheet, numeral 309 denotes a transfer member, numeral 310 denotes a metal mold, and numeral 312 denotes incident light.

In the anti-reflection member 301 of the present invention, two anti-reflection component layers having an interface with an uneven shape between both the layers are stacked on a transparent window of the transparent substrate 307 (see FIG. 26).

In order that the two anti-reflection component layers having the interface with the uneven shape between both the layers may be provided on the transparent substrate 307, preferably used is a transferring method or a molding in-mold transferring method using the transfer member 309.

The transferring method is such a method as follows. The transfer member 309 having transfer layers of various layers formed on the substrate sheet 308 is used, heat and pressure are applied thereto to make the transfer layers adhere onto an object of transfer, the substrate sheet 308 is thereafter peeled off, and only the transfer layers are transferred to a surface of the object of transfer to make decoration. The molding in-mold transferring method is such a method as follows. The transfer member 309 is interposed into the metal mold 310, molten resin is injected into the metal mold 310, a resin molding is obtained by cooling, the transfer member 309 is bonded onto a surface of the molding simultaneously with this obtainment, the substrate sheet 308 is thereafter peeled off, and transfer layers are transferred onto the surface of the resin molding to make decoration.

In the present invention is used the transfer member 309 in which the two anti-reflection component layers having the interface with the uneven shape between both the layers are formed at least as the transfer layers on the substrate sheet 308 (see FIG. 27). As for the transfer layers, preferably, not all the layers that are to be formed on the transparent substrate 307 of the anti-reflection member 301 are incorporated into the transfer layers, but only layers suitable for formation by the molding in-mold transferring method are the transfer layers, and other layers are formed separately. The uneven layer 304, the pattern layer 305, and the like are particularly suitable for formation by the molding in-mold transferring method.

As material of the substrate sheet 308 may be used material that is used as a substrate sheet for conventional transfer member, for example, a resin sheet of polypropylene resin, polyethylene resin, polyamide resin, polyester resin, acrylic resin, polyvinyl-chloride resin, or the like.

Provided that peelability of the transfer layers from the substrate sheet 308 is satisfactory, the transfer layers may be provided directly on the substrate sheet 308. In order to improve the peelability of the transfer layers from the substrate sheet 308, a mold release layer may be formed before the transfer layers are provided on the substrate sheet 308.

As occasion demands, the low-reflectance layer 303 is preferably formed on the substrate sheet 308 or the mold release layer. With provision of the low-reflectance layer 303, reflection of the incident light 312 can be prevented more thoroughly.

As material of the low-reflectance layer 303 may be used a vapor deposited layer of a metal compound such as $Al_2O_3$, $ZnO_2$, or $MgF_2$; a vapor deposited layer in which a metal compound having a low index of refraction such as $SiO_2$ or $MgF_2$ and a metal compound having a high index of refraction such as $ZnO_2$ or $TiO_2$ are laminated; or a resin coating layer composed of fluoropolymer, silicon oxide gel, or the like, for example. A combination of these materials may be used.

Among methods of manufacturing the low-reflectance layer 303 are a vacuum deposition method, a sputtering technique, ion plating, and the like. There also is a method in which the low-reflectance layer 303 is obtained by application of an organic metal compound such as metal alcoholate or metal chelate by performing a dipping method, a printing process, a coating process, or the like and subsequent formation of metal oxide film by performing photoirradiation or drying.

The low-reflectance layer 303 may be composed of only one layer having a low index of refraction or may be a complex layer of layer(s) with a low index of refraction and layer(s) with a high index of refraction. Use of the complex layer may improve an anti-reflection property. In order to cancel an increase in number of man-hours that may be caused by use of the complex layer, it is extremely efficient to form the low-reflectance layer 303 by performing a roll-to-roll continuous coating process. For such a transfer member 309 as in this embodiment, roll-to-roll continuous production can be achieved.

Preferably, a film thickness of the low-reflectance layer 303 is appropriately selected so as to satisfy a general expression $nd=\lambda/4$ or a general expression $nd=3\lambda/4$ (wherein n is an index of refraction of a substance with a low index of refraction, d is a film thickness of the substance with the low index of refraction, and $\lambda$ is a low reflection central wavelength). In ordinary cases, the thickness of the low-reflectance layer 303 is in a range of 0.01 to 2 μm.

Subsequently, the uneven layer 304 is provided. By provision of the uneven layer 304 is formed an upper layer of two anti-reflection component layers having an interface with an uneven shape between both the layers. As material of the uneven layer 304 is preferably used acrylic resin, polyester resin, polyvinyl chloride resin, cellulosic resin, rubber resin, polyurethane resin, polyvinyl acetate resin, or the like; or a copolymer such as vinyl chloride vinyl acetate copolymer resin or ethylene vinyl acetate copolymer resin, or the like. A hardness of the uneven layer 304 can be increased with use of thermosetting resin, resin curable by ionizing radiation such as ultraviolet ray or electron beam, or the like. Ultraviolet curable resins include ultraviolet curable acrylic urethane resin, ultraviolet curable polyester acrylate resin, and ultraviolet curable epoxy acrylate resin, and are used with a photoinitiator. For example, ultraviolet curable acrylic urethane resin is obtained by reaction of polyester polyol with isocyanate monomer or prepolymer and by reaction of a resultant product with acrylate or methacrylate monomer having hydroxyl groups. As the photoinitiator may be used benzophenones, acetophenones, anthraquinone derivatives or the like, singly or in combination. For improving formation of coating, thermoplastic acrylic resin or the like may appropriately be selected and blended with ultraviolet curable resins.

Among methods of forming the uneven layer 304 are coating such as gravure coating, roll coating, or comma coating; or a printing process such as gravure or screen printing.

Among methods of forming an uneven surface of the uneven layer 304 are a method in which the uneven layer 304 mixed with a light diffusing agent is applied directly onto a surface of the substrate, a method in which the surface of the uneven layer 304 is embossed, and the like.

As the light diffusing agent are preferably used silica beads, acrylic beads, or the like subjected to organic coating process. In order that the light diffusing agent subjected to organic coating process may be dispersed in the uneven layer 304, a content of the light diffusing agent is preferably not more than 15 parts by weight per 100 parts of ink for the uneven layer 304.

With use of silica beads having particle sizes on the order of 0.4 to 8 μm, uneven surfaces having various average surface roughnesses Ra were formed on the uneven layers 304 of ultraviolet curable resin having a thickness of 5 μm, total light transmittances and reflectances at 550 nm were measured for verification of an anti-reflection effect, and it was resultingly found that the average surface roughnesses were preferably controlled within a range of 0.2 to 1.0 μm (see Table 5).

On comparison between an example in which the anti-reflection member 301 was manufactured by the method of manufacturing the anti-reflection member 301 of the third embodiment of the present invention and an example in which the low-reflectance layer 303 was formed after production of a molding, it was found that the example of the third embodiment of the present invention not only improved an anti-reflection effect but also tended to increase light transmittance a little (see Table 6). A conceivable reason for that is that a part of incident light 312 reflected irregularly by the uneven shape could not come out of the surface easily because of repeated reflection by an interface between the uneven layer 304 and the low-reflectance layer 303 and the like, in a structure in which the uneven shape resided inside the anti-reflection member 301 (see FIG. 26). Total light transmittance was measured on basis of a method defined by Japanese Industrial Standard (JIS) K6714.

As occasion demands, the pattern layer 305 may be formed. The pattern layer 305 is a layer for decorating the anti-reflection member 301. Provided that the anti-reflection member 301 is a cover component for a display section, the pattern layer 305 is partially provided so as to be shaped like a frame, a letter, or the like in a pattern excluding the transparent window, in ordinary cases. The pattern layer 305 is commonly formed as a print layer. As material of the print layer is preferably used colored ink that contains as binder such resin as polyvinyl resin, polyamide resin, polyester resin, acrylic resin, polyurethane resin, polyvinyl acetal resin, polyesterurethane resin, cellulose ester resin, or alkyd resin and that contains, as coloring agent, pigment or dye that has an appropriate color. As methods of forming the print layer, a conventional printing process such as offset printing, gravure printing, and screen printing, or the like is employed preferably.

The pattern layer 305 may be composed of a metal thin film layer or a combination of a print layer and a metal thin film layer. The metal thin film layer is intended for expressing metallic luster in the pattern layer 305 and is formed by performing a vacuum deposition method, sputtering technique, ion plating, plating, or the like. Metal such as aluminum, nickel, gold, platinum, chromium, iron, copper, tin, indium, silver, titanium, lead, or zinc; or an alloy; or a compound of these metals is used in accordance with a desired color of metallic luster that is to be expressed. In ordinary cases, the metal thin film layer is formed partially. When the metal thin film layer is provided, a pre-anchor layer and/or a post-anchor layer may be provided for improving adhesion to other layers.

Adhesive layers 306 are formed for bonding the above-mentioned layers onto the transparent substrate 307. With contact between the uneven layer 304 and the adhesive layer 306, the two anti-reflection component layers having the interface with the uneven shape between both the layers are formed. For the adhesive layer 306 is appropriately used heat-sensitive or pressure-sensitive resin suitable for material of the transparent substrate 307.

Provided that the material of the transparent substrate 307 is acrylic resin, for example, acrylic resin is preferably used for the adhesive layer. Provided that the material of the transparent substrate 307 is polyphenylene oxide polystyrene resin, polycarbonate resin, or polystyrene blend resin, preferably used is acrylic resin, polystyrene resin, polyamide resin, or the like that has an affinity for the above resins. Provided that the material of the transparent substrate 307 is polypropylene resin, it is possible to use chlorinated polyolefin resin, chlorinated ethylene vinyl acetate copolymer resin, cyclized rubber, or coumarone-indene resin. Among methods of forming the adhesive layer 306 are coating such as gravure coating, roll coating, or comma coating; or a printing process such as gravure or screen printing.

A configuration of the transfer layers is not limited to the above-mentioned manner. Provided that a transparent layer that is excellent in terms of adhesiveness with respect to the transparent substrate 307 is used as the material of the pattern layer 305, for example, the transparent layer serves as a lower layer of the anti-reflection component layers and therefore allows the adhesive layer 306 to be omitted.

The anti-reflection component layers having the interface with the uneven shape are not limited to the combination of the uneven layer 304 and the adhesive layer 306 or the combination of the uneven layer 304 and the pattern layer 305 (see FIG. 26) but may be configured so as to be made of a combination with other layers. For example, as shown in FIG. 32, a combination of the uneven layer 304 and an interlayer 330 may be used. The interlayer 330 is preferably formed with use of material similar to that of the uneven layer 304. As shown in FIG. 33, a configuration may be adopted such that an anti-reflection function is achieved by two uneven interfaces 332 having uneven shapes and configured by three layers of the uneven layer 304, the interlayer 330, and the adhesive layer 306.

Provided that the uneven interface 332 having an uneven shape is configured by two layers other than the adhesive layer 306, the adhesive layer 306 can be formed with a uniform thickness regardless of sizes of projections and depressions in the uneven shape, so that adhesiveness thereof to the transparent substrate 308 can be stabilized. Provided that the uneven interface 332 having an uneven shape is configured by two layers of the adhesive layer 306 and another layer, a number of layers that constitute the anti-reflection member can be reduced by one.

Depending on uses of the anti-reflection member 301, a distinction may be made on a surface of the member, between an area where excellent anti-reflection function is particularly required and an area where a little decrease in anti-reflection function causes no noticeable issues. FIG. 15 is the perspective view illustrating an anti-reflection member 301 that is used in a full-color liquid crystal display section of a portable telephone and that is 25 mm long and 33 mm wide, as an example. In the anti-reflection member 301 for such a use, a central area CA is a region a user of the portable telephone watches most carefully, in other words, a visual recognition area in the transparent window, and therefore is an area that particularly requires anti-reflection function. By contrast, a marginal area CB that is a periphery of the central area CA and is a margin of the liquid crystal display section, in other words, a peripheral visual recognition area on periphery of the visual recognition area in the transparent window is not the region a user of the portable telephone watches carefully, and the area CB therefore does not require so high degree of an anti-reflection function. The smaller a radius R of curvature of a surface shape of the anti-reflection member 301, the lower a degree of necessity for an anti-reflection function. Provided that a surface shape of the anti-reflection member 301 shown in FIG. 15 has a sectional shape shown in FIG. 16, for example, there is little possibility that a user of the portable telephone may carefully watch the extremely small area CB having a radius R of curvature smaller than 40 mm.

Accordingly, as shown in FIG. 34, the central area CA and the marginal area CB may be configured so as to have different uneven shapes. That is, configured are an uneven interface 332B that is provided in the central area CA and that is greatly uneven, and an uneven interface 332S that is provided in the marginal area CB and that is slightly uneven. The different uneven shapes are preferably made with variation during degree of unevenness in an emboss process or other process.

With use of such an anti-reflection transfer member 309 configured as described above, use of a transfer process may be made so that the anti-reflection member 301 may be obtained easily.

A side of the anti-reflection transfer member 309 having the adhesive layer 306 is initially brought into intimate contact with a surface of the transparent substrate 307. With use of a transferring machine such as roll transferring machine or up-down transferring machine provided with a heat-resistant-rubber-like elastic body of silicone rubber or the like, subsequently, heat and pressure are applied from a side of the anti-reflection transfer member 309 having the substrate sheet 308 through the heat-resistant-rubber-like elastic body provided with a condition of a temperature on the order of 80 to 260° C. and of a pressure on the order of 490 to 1960 Pa. By this process, the adhesive layer 306 is bonded onto the surface of the transparent substrate 307.

Finally, the substrate sheet 308 is peeled off after being cooled, exfoliation is then caused at an interface surface between the substrate sheet 308 and the low-reflectance layer 303, and the transfer is completed. On condition that the mold release layer is provided on the substrate sheet 308, peeling the substrate sheet 308 causes exfoliation at an interface surface between the mold release layer and the low-reflectance layer 303 and completes the transfer. Thus, the anti-reflection member 301 is obtained.

There will now be described a method of obtaining the anti-reflection member 301 by making use of the molding in-mold transferring method by injection molding with use of the above-mentioned anti-reflection transfer member 309.

As the metal mold 310 for molding, a metal mold for use in injection molding is used.

The transfer member 309 is initially delivered into the metal mold 310 for molding (see FIG. 29). In this step, sheet-like transfer members 309 may be delivered one by one or required portions of long-sized transfer member 309 may be delivered intermittently. In the case that the long-sized transfer member 309 is used, a feeder having a positioning device is preferably used so that the pattern layer 305 of the transfer member 309 and the metal mold 310 for molding may be in register. When the transfer member 309 is delivered intermittently, it is convenient to hold the transfer member 309 by a movable mold and a stationary mold after detection of a position of the transfer member 309 by a sensor, in that the transfer member 309 may be held in the same position at any time and in that mis-registration of the pattern layer 305 is prevented.

After closure of the metal mold 310 for molding, molten resin is injected from a gate into the metal mold 310 to fill the mold, an object of transfer is formed and, simultaneously with this formation, the transfer member 309 is made to adhere onto a surface of the object (see FIG. 30).

As resin that may be used for the transparent substrate 307 may be named general-purpose resins such as polystyrene resin, polyolefin resin, ABS resin, AS resin, or AN resin. There also may be used general-purpose engineering resin such as polyphenylene oxide polystyrene resin, polycarbonate resin, polyacetal resin, acrylic resin, polycarbonate denatured polyphenylene ether resin, polybutylene terephthalate resin, or ultragiant molecular weight polyethylene resin; and super engineering resin such as polysulfone resin, polyphenylene sulfide resin, polyphenylene oxide resin, polyarylate resin, polyetherimide resin, polyimide resin, liquid crystalline polyester resin, or polyallyl heat-resistant resin. These molding resins may be mixed with light diffusing agent composed of silica beads, acrylic beads, or the like; or the like.

The transparent substrate 307 may have a tabular shape or a shape including a two-dimensional or three-dimensional curved surface.

A resin molding as the object of transfer is cooled, the metal mold 310 for molding is thereafter opened, and the resin molding is removed. Finally, the substrate sheet 308 of the transfer member 309 is peeled off. Thus, only the transfer layers are transferred to the molding.

With integration of the transfer layers and molding resin in this manner, there may be formed the anti-reflection member 301 in which the two anti-reflection component layers having the interface with the uneven shape between both the layers are stacked on the transparent window of the transparent substrate 307 (see FIGS. 26 and 28).

Provided that the anti-reflection member 301 obtained with use of the transfer member 309 as described above does not have the low-reflectance layer 303 formed therein, the low-reflectance layer 303 may be provided as occasion demands. The low-reflectance layer 303 can be formed as in the case of formation as the transfer layers of the transfer member 309.

As occasion demands, the anti-fouling layer 302 may be provided. The anti-fouling layer 302 is a layer that is provided on the low-reflectance layer 303 to prevent contamination of the anti-reflection member 301 and that is composed of material having water-repellency and oil-repellency. For the anti-fouling layer 302 is preferably used a surface active agent having fluorine in end groups, or the like. The anti-fouling layer 302 is preferably provided by performing a coating process, dipping method, vacuum deposition method, or the like. It is preferable for a thickness of the anti-fouling layer 302 to be as small as possible. That is because a light transmittance of the anti-reflection member 301 decreases with increase in the thickness of the anti-fouling layer 302.

Thus, the anti-reflection member 301 is configured so that the two anti-reflection component layers having the interface with the uneven shape between both the layers are stacked on the transparent window of the transparent substrate 307, a part of incident light 312 reflected irregularly by the uneven interface is reflected again by other interfaces and, therefore, light transmittance can be increased and a greater anti-reflection effect can be achieved in comparison with the configuration in which a glare-proof property is obtained by diffused reflection by an uneven surface formed on an anti-reflection member.

Hereinbelow, more concrete examples of the third embodiment will be described as working examples.

WORKING EXAMPLES 41 THROUGH 47

Polyethylene terephthalate resin films with a thickness of 25 μm were used as substrate sheets, and the films were coated with melamine resin so that mold release layers were formed. Low-reflectance layers composed of silicon oxide with a thickness of about 0.1 μm were formed thereon. Ink for uneven layers in which eight parts by weight of silica beads having particle sizes on the order of 0.4 to 8.0 μm were added to 100 parts by weight of ultraviolet curable resin (ARONIX M8030 produced by TOAGOSEI CO., LTD.) was prepared to form thereon uneven layers that were uneven with various average surface roughnesses and that had a mean thickness of 5 μm. Adhesive layers were formed thereon with use of acrylic adhesive ink and transfer members were thus obtained.

Acrylic films with a thickness of 125 μm were used as transparent substrates, were layered on the transfer members, and were bonded with heat and pressure applied from a side having the substrate sheet by a roll transferring machine, the substrate sheets were peeled off and were removed with the mold release layers, and obtained were anti-reflection members having the low-reflectance layers, the uneven layers, and the adhesive layers formed sequentially from a surface side.

TABLE 5

| | Particle size of beads (μm) | Surface roughness of hardcoat layer (μm) | Total light transmittance (%) | Reflectance (%) | Evaluation |
|---|---|---|---|---|---|
| Contrast example | No addition | 0.1 | 91 | 0.8 | Δ |
| Working Example 41 | 0.4 | 0.1 | 86 | 0.8 | Δ |
| Working Example 42 | 0.5 | 0.2 | 89 | 0.1 | ○ |
| Working Example 43 | 1.0 | 0.5 | 85 | 0.1 | ○ |
| Working Example 44 | 3.0 | 0.8 | 82 | 0.1 | ○ |
| Working Example 45 | 5.0 | 1.0 | 75 | 0.1 | ○ |

TABLE 5-continued

| | Particle size of beads (μm) | Surface roughness of hardcoat layer (μm) | Total light transmittance (%) | Reflectance (%) | Evaluation |
|---|---|---|---|---|---|
| Working Example 46 | 6.0 | 1.2 | 66 | 0.1 | x |
| Working Example 47 | 8.0 | 1.6 | 49 | 0.1 | x |

Herein, evaluation "O" designates "good", "Δ" designates "fair", and "x" designates "failure". As a result, it was found that the average surface roughness of the uneven layer was preferably within a range of 0.2 to 1.0 μm. On condition that the average surface roughness exceeded 1.0 μm, light transmittance was considerably decreased so that a screen was hard to see.

WORKING EXAMPLE 42

A polyethylene terephthalate resin film with a thickness of 25 μm was used as a substrate sheet, a mold release layer composed of melamine resin was formed thereon, sequentially formed by a multicolor gravure printing press were a low-reflection layer composed of a layer having a low index of refraction, having a thickness of 0.09 μm, and using OPSTER JN7215 produced by JSR Corporation as ink for the layer having the low index of refraction and of a layer having a high index of refraction, having a thickness of 0.12 μm, using OPSTER JN7102 produced by JSR Corporation as ink for the layer having the high index of refraction; an uneven layer using ink for uneven layer in which eight parts by weight of silica beads having particle sizes of 0.5 μm were added to 100 parts by weight of ultraviolet curable resin (ARONIX M8030 produced by TOAGOSEI CO., LTD.); and an adhesive layer using adhesive ink of acrylic resin, and thus a transfer member was obtained.

The transfer member was loaded into an injection metal mold (a female mold) that corresponded to a surface shape of a molding for a display section of a portable telephone, the metal mold was closed, acrylic molding resin produced by Mitsubishi Rayon Co., Ltd. was injected, and an anti-reflection member that was the molding for the display section of the portable telephone was obtained.

As a contrast example 2, a molding was previously manufactured, the above-mentioned four types of ink, i.e., adhesive ink, ink for an uneven layer, ink for a layer having a high index of refraction, and ink for a layer having a low index of refraction were provided, in order of mention, on the molding by performing dipping coating, and thus an anti-reflection member was obtained.

On comparison between the anti-reflection members thus obtained, the contrast example 2 exhibited a tendency to have a large difference in film thickness along a direction of application and was found to have a large variation in anti-reflection performance in a surface thereof. The working example 48 was superior also in comparison concerning reflectance and light transmittance, at 550 nm. Moreover, the working example 48 was superior also in terms of productivity.

TABLE 6

| | Working Example 48 | Contrast example 2 |
|---|---|---|
| Thickness of layer having low index of refraction (μm) | 0.09 ± 0.01 | 0.09 ± 0.04 |
| Thickness of layer having high index of refraction (μm) | 0.12 ± 0.01 | 0.12 ± 0.05 |
| Thickness of uneven layer (μm) | 5.1 ± 0.6 | 5.1 ± 0.6 |
| Thickness of adhesive layer (μm) | 1.8 ± 0.4 | 1.8 ± 0.5 |
| Reflectance of molding surface (%) | 0.0~0.3 | 0.8~5.2 |
| Light transmittance of molding (%) | 89 | 86 |

The third embodiment of the present invention adopts such a configurations as described above and therefore achieves such effects as follows.

In the anti-reflection member of the third embodiment of the present invention, the two anti-reflection component layers having the interface with the uneven shape between both the layers are stacked on the transparent window of the transparent substrate, and the anti-reflection member therefore has an excellent anti-reflection effect.

In the anti-reflection member of the third embodiment of the present invention and the method of manufacturing the same, the transfer member in which at least the two anti-reflection component layers having the interface with the uneven shape between both the layers are formed on the substrate sheet is set in the metal mold so that the substrate sheet comes into contact with its cavity surface, transparent molten resin is injected into the metal mold so that an integrated body of the transparent substrate formed of the resin and the transfer member is obtained, the substrate sheet is subsequently peeled off, and thus the anti-reflection member having an excellent anti-reflection effect can be obtained easily.

Arbitrary embodiments among the above-mentioned various embodiments may be combined appropriately so that the effects the embodiments have may be achieved.

Figure 35:
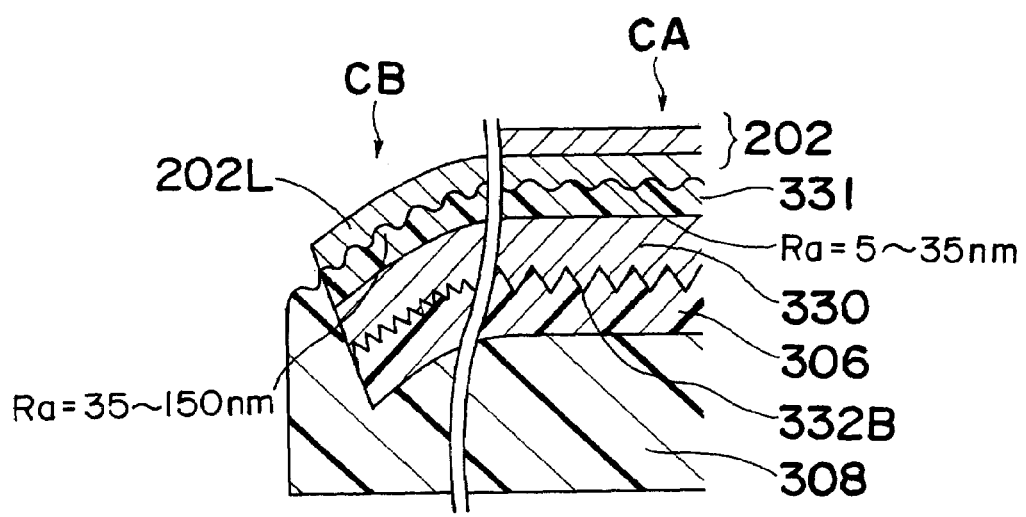
FIG. 35 is a sectional view illustrating an anti-reflection member in accordance with a combination of the first embodiment and the third embodiment of the present invention.

For example, FIG. 35 is a sectional view illustrating an anti-reflection member in accordance with a combination of the first embodiment and the third embodiment of the present invention. That is, in a central area CA, the member is composed of high-degree anti-reflection layers 202H composed of a plurality of layers, a hard-coat layer 331, an interlayer 330, an adhesive layer 306, and a substrate 308, an average surface roughness Ra of a surface of the hard-coat layer 331 is between 5 and 35 nm, and an interface between the interlayer 330 and the adhesive layer 306 is an uneven interface 332B having great unevenness. In a marginal area CB, the member is composed of low-degree anti-reflection layers 202L, the hard-coat layer 331, the interlayer 330, the adhesive layer 306, and the substrate 308, an average surface roughness Ra of the surface of the hard-coat layer 331 is between 35 and 150 nm, and an interface between the interlayer 330 and the adhesive layer 306 is an uneven interface 332S having a little unevenness. Thus, the effects of the first embodiment and of the third embodiment can be achieved collectively.

Figure 36:
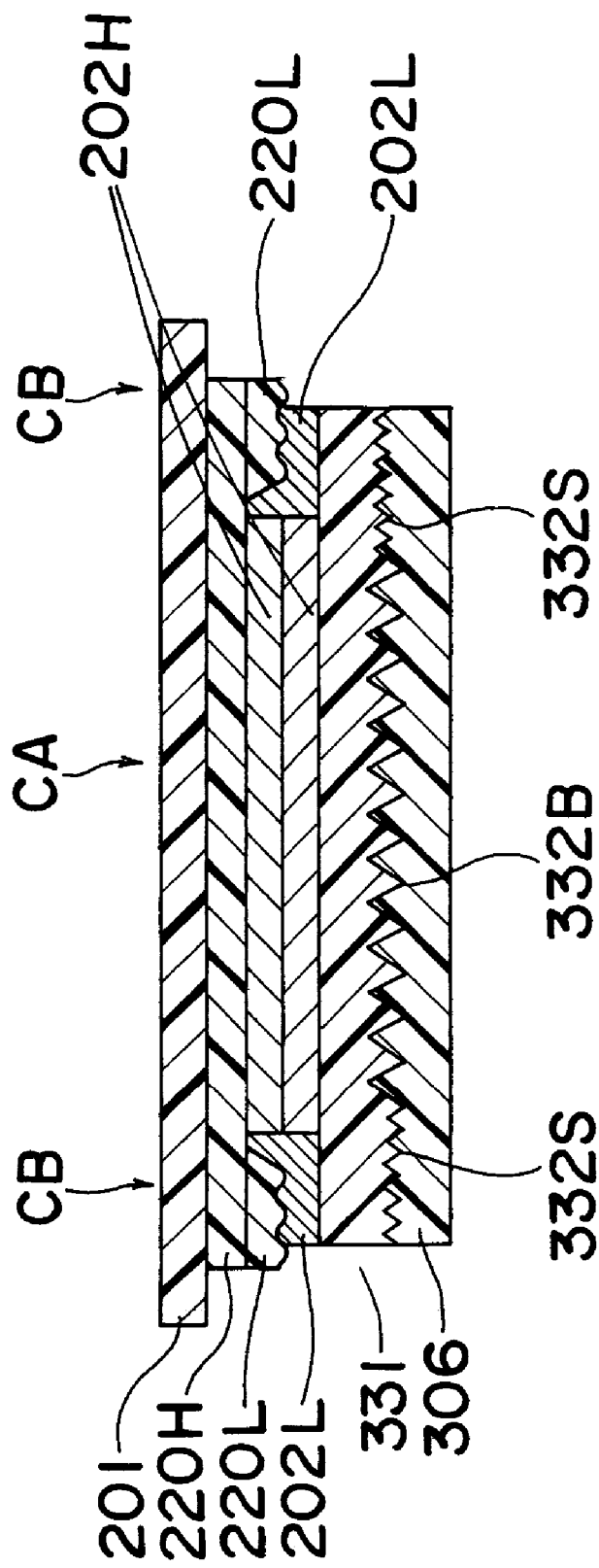
FIG. 36 is a sectional view illustrating an anti-reflection member in accordance with a combination of the second embodiment and the third embodiment of the present invention.

FIG. 36 is a sectional view illustrating an anti-reflection member in accordance with a combination of the second embodiment and the third embodiment of the present invention. That is, in a central area CA, the member is composed of a substrate sheet 201, a mold release layer 220H having a small average surface roughness Ra, high-degree anti-reflection layers 202H composed of a plurality of layers, a hard-coat layer 331, and an adhesive layer 306, and an interface between the hard-coat layer 331 and the adhesive layer 306 is an uneven interface 332B having great unevenness. In a marginal area CB, the member is composed of the substrate sheet 201, a mold release layer 220L having an average surface roughness Ra on the order of 110 to 140 nm, i.e., in a range in which a minimal anti-reflection effect may be obtained, a low-degree anti-reflection layer 202L, the hard-coat layer 331, and the adhesive layer 306, and an interface between the hard-coat layer 331 and the adhesive layer 306 is an uneven interface 332S having a little unevenness. Thus, the effects of the second embodiment and of the third embodiment can be achieved collectively.

In those structures in which two embodiments are combined, light that comes to the uneven interface is scattered in the vicinity of the interface and is brightened by a diffusion effect. On the other hand, light in the vicinity of the anti-reflection layers that are outermost layers is cancelled by interference. Thus, a bright screen is achieved but the brightness causes no glare, and a display screen that may be viewed extremely comfortably by viewers and that is easy on eyes is achieved.

Application of the present invention to electronic paper, that is an electronic display device as light, thin, and flexible as paper, requires a function such that the molding as electronic paper may be folded, and therefore requires flexibility of the anti-reflection layers, and material of the anti-reflection layers is preferably a resin coating layer. In addition, an anti-fouling layer is preferably provided.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A method of manufacturing anti-reflection molding, comprising:
    placing a decorating sheet having at least a hard-coat layer formed on a substrate sheet to come a substrate sheet side thereof into contact with a cavity surface of a mold that is a curved surface having a radius of curvature of not less than 40 mm or a flat surface in an area corresponding to a transparent window;
    injecting transparent molten resin into the mold to obtain an integrated body of the decorating sheet and of a transparent substrate composed of the resin;
    subsequently peeling the substrate sheet from the integrated body to form a curved surface having a radius of curvature of not less than 40 mm and protruding on a surface side thereof or a flat surface that has an average surface roughness Ra of between 2.0 and 150 nm in the transparent window; and
    subsequently forming an anti-reflection layer on a surface side of the transparent substrate.

2. A method of manufacturing anti-reflection molding, comprising:
    placing a decorating sheet having at least a hard-coat layer formed on a substrate sheet to come a side having the hard-coat layer into contact with a cavity surface of a mold that is a curved surface having a radius of curvature of not less than 40 mm or a flat surface in an area corresponding to a transparent window;
    injecting transparent molten resin into the mold to obtain an integrated body of the decorating sheet and of a transparent substrate composed of the resin and to form a curved surface having a radius of curvature of not less than 40 mm and protruding on a surface side thereof in a shape of the transparent window or a flat surface that has an average surface roughness Ra of between 2.0 and 150 nm in the transparent window; and
    subsequently forming an anti-reflection layer on a surface side of the transparent substrate.

3. A method of manufacturing anti-reflection molding as claimed in any one of claims 1 and 2, wherein the decorating sheet has the allover hard-coat layer, a partial pattern layer with a pattern excluding the transparent window, and an allover adhesive layer that are formed at least on the substrate sheet.

4. A method of manufacturing anti-reflection molding as claimed in claim 3, wherein an antifouling layer is formed on the anti-reflection layer.

5. A mold for anti-reflection molding by which an anti-reflection molding is molded that has at least a hard-coat layer formed on a surface of a transparent substrate and that has a curved surface having a radius of curvature of not less than 40 mm and protruding on a surface side thereof in a transparent window or a flat surface with an average surface roughness Ra of between 2.0 and 150 nm in the transparent window,
    the mold for anti-reflection molding, having a cavity surface that is a curved surface having a radius of curvature of not less than 40 mm or a flat surface in an area corresponding to the transparent window.

6. A mold for anti-reflection molding as claimed in claim 5, wherein the cavity surface has an average surface roughness Ra of between 2.0 and 170 nm in the area corresponding to the transparent window.

7. A method of manufacturing anti-reflection member, comprising:
    setting a transfer member wherein at least two anti-reflection component layers having interfaces with uneven shapes between both the layers are formed on a substrate sheet, in a mold to come the substrate sheet into contact with a cavity surface;
    injecting transparent molten resin into the mold to obtain an integrated body of the transfer member and a transparent substrate composed of the resin; and
    subsequently peeling the substrate sheet from the integrated body.

8. A method of manufacturing anti-reflection member as claimed in claim 7, wherein the uneven shape exhibits an average surface roughness Ra of between 0.2 and 1.0 μm.

9. A method of manufacturing anti-reflection member as claimed in any one of claims 7 and 8, wherein an upper layer of the anti-reflection component layers is composed of thermosetting resin, ultraviolet curable resin, or electron beam curable resin.

10. A method of manufacturing anti-reflection member as claimed in any one of claims 7 and 8, wherein a low-reflectance layer having a reflectance lower than that of the upper layer is formed on the upper layer of the anti-reflection component layers.

11. A method of manufacturing anti-reflection member as claimed in claim 10, wherein an antifouling layer is formed on the low-reflectance layer.

12. A method of manufacturing anti-reflection member as claimed in any one of claims 7 and 8, wherein a pattern layer is formed outside the transparent window.

13. An anti-reflection molding comprising:
a transparent substrate, a transparent window and an anti-reflection layer arranged relative to one another such that said transparent window is positioned between said transparent substrate and said anti-reflection layer,
wherein said anti-reflection layer is on a surface of said transparent window such that said surface defines an interface between said anti-reflection layer and said transparent window, with said interface having an average surface roughness Ra of between 2 nm and 150 nm, and said surface of said transparent window
(i) being convex and having a radius of curvature of at least 40 mm, or
(ii) being planar.

14. The anti-reflection molding according to claim 13, further comprising:
a partial pattern layer having a pattern between said transparent substrate and said anti-reflection layer, said partial pattern layer covering only a portion of said transparent window such that a remaining portion of said transparent window is not covered by said partial pattern layer.

15. The anti-reflection molding according to any one of claims 13 or 14, further comprising:
a hard-coat layer between said transparent substrate and said anti-reflection layer, wherein said transparent window is at least partially defined by said hard-coat layer.

16. The anti-reflection molding according to claim 15, further comprising:
an anti-fouling layer on said anti-reflection layer.

17. The anti-reflection molding according to any one of claims 13 or 14, wherein
a portion of said interface corresponding to a central visual recognition area of said transparent window has an average surface roughness Ra of between 2 nm and 35 nm, and
a portion of said interface corresponding to a peripheral visual recognition area of said transparent window, along a periphery of said central visual recognition area, has an average surface roughness Ra of between 35 nm and 85 nm.

18. An anti-reflection transfer member comprising:
a substrate sheet; and
an anti-reflection layer on a surface of said substrate sheet, wherein
(i) said anti-reflection layer is directly on said surface of said substrate sheet, with said surface of said substrate sheet having an average surface roughness Ra of between 2 nm and 150 nm, or
(ii) a mold release layer is between said anti-reflection layer and said surface of said substrate sheet, with a surface of said mold release layer facing said anti-reflection layer having an average surface roughness Ra of between 2 nm and 150 nm.

19. The anti-reflection transfer member according to claim 18, wherein
said surface of said substrate sheet has an average surface roughness Ra of between 5 nm and 140 nm when said anti-reflection layer is directly on said surface of said substrate sheet, or
said surface of said mold release layer facing said anti-reflection layer has an average surface roughness Ra of between 5 nm and 140 nm when said mold release layer is between said anti-reflection layer and said surface of said substrate sheet.

20. The anti-reflection transfer member according to claim 19, wherein
said surface of said substrate sheet has an average surface roughness Ra of between 5 nm and 80 nm when said anti-reflection layer is directly on said surface of said substrate sheet, or
said surface of said mold release layer facing said anti-reflection layer has an average surface roughness Ra of between 5 nm and 80 nm when said mold release layer is between said anti-reflection layer and said surface of said substrate sheet.

21. The anti-reflection transfer member according to any one of claims 18 through 20, further comprising:
a hard-coat layer on said anti-reflection layer, with said hard-coat layer being one of an ultraviolet curable resin, an electron beam curable resin and a thermosetting resin.

22. The anti-reflection transfer member according to any one of claims 18 or 19, further comprising:
a transparent window; and
a pattern layer covering only a portion of said transparent window such that a remaining portion of said transparent window is not covered by said pattern layer.

23. An anti-reflection member comprising:
a first anti-reflection component layer and a second anti-reflection component layer stacked on a transparent window of a transparent substrate,
wherein an interface between said first and second anti-reflection component layers is uneven.

24. The anti-reflection member according to claim 23, wherein
said interface exhibits an average surface roughness Ra of between 0.2 μm and 1.0 μm.

25. The anti-reflection member according to any one of claims 23 or 24, wherein
an upper one of said first and second anti-reflection component layers is one of an ultraviolet curable resin, an electron beam curable resin and a thermosetting resin.

26. The anti-reflection member according to claim 24, further comprising:
a low reflectance layer on said upper one of said first and second anti-reflection component layers, with said low reflectance layer having a reflectance lower than a reflectance of said upper one of said first and second anti-reflection component layers.

27. The anti-reflection member according to claim 26, further comprising:
an anti-fouling layer on said low reflectance layer.

28. The anti-reflection member according to any one of claims 23 and 24, further comprising:
a pattern layer covering only a portion of said transparent window such that a remaining portion of said transparent window is not covered by said pattern layer.

29. An anti-reflection molding comprising:
a transparent substrate;
a first anti-reflection component layer and a second anti-reflection component layer stacked on said transparent substrate, with an interface between said first and second anti-reflection component layers being uneven;
a hard-coat layer on the stacked first and second anti-reflection component layers, with said hard-coat layer and the stacked first and second anti-reflection component layers defining a transparent window; and an anti-reflection layer on a surface of said transparent window such that said surface defines an interface between said anti-reflection layer and said transparent window, wherein said interface has an average surface roughness Ra of between 2 nm and 150 nm, and said surface of said transparent window
 (i) is convex and has a radius of curvature of at least 40 mm, or
 (ii) is planar.

30. An anti-reflection transfer member comprising:
a substrate sheet;
an anti-reflection layer on a surface of said substrate sheet, wherein
 (i) said anti-reflection layer is directly on said surface of said substrate sheet, with said surface of said substrate sheet having an average surface roughness Ra of between 2 nm and 150 nm, or
 (ii) a mold release layer is between said anti-reflection layer and said surface of said substrate sheet, with a surface of said mold release layer facing said anti-reflection layer having an average surface roughness Ra of between 2 nm and 150 nm; and a first anti-reflection component layer and a second anti-reflection component layer stacked on said anti-reflection layer, with an interface between said first and second anti-reflection component layers being uneven.

31. The anti-reflection molding according to claim 21, wherein said ultraviolet curable resin is selected from the group consisting of ultraviolet curable acrylic urethane resin, ultraviolet curable polyester acrylate resin, and ultraviolet curable epoxy acrylate resin.

* * * * *